(12) United States Patent
Garfinkel

(10) Patent No.: US 7,779,032 B1
(45) Date of Patent: Aug. 17, 2010

(54) FORENSIC FEATURE EXTRACTION AND CROSS DRIVE ANALYSIS

(75) Inventor: Simson L. Garfinkel, Belmont, MA (US)

(73) Assignee: Basis Technology Corporation, Cambridge, MA (US)

( * ) Notice: Subject to any disclaimer, the term of this patent is extended or adjusted under 35 U.S.C. 154(b) by 1015 days.

(21) Appl. No.: 11/470,517

(22) Filed: Sep. 6, 2006

Related U.S. Application Data

(63) Continuation-in-part of application No. 11/456,770, filed on Jul. 11, 2006, now abandoned.

(60) Provisional application No. 60/805,989, filed on Jun. 28, 2006, provisional application No. 60/698,741, filed on Jul. 13, 2005.

(51) Int. Cl.
*G06F 17/30* (2006.01)
*G06F 12/00* (2006.01)
*G06F 7/00* (2006.01)

(52) U.S. Cl. .................. 707/776; 707/822; 707/823

(58) Field of Classification Search .......... 707/687, 707/688, 776, 822, 823
See application file for complete search history.

(56) References Cited

U.S. PATENT DOCUMENTS

| | | | |
|---|---|---|---|
| 6,263,349 B1 * | 7/2001 | Anderson | 707/205 |
| 6,279,010 B1 * | 8/2001 | Anderson | 707/202 |
| 6,345,283 B1 * | 2/2002 | Anderson | 707/205 |
| 6,377,958 B1 | 4/2002 | Orcutt | |
| 7,644,138 B2 * | 1/2010 | Sun | 709/219 |
| 2003/0208689 A1 * | 11/2003 | Garza | 713/201 |
| 2004/0260733 A1 * | 12/2004 | Adelstein et al. | 707/202 |

OTHER PUBLICATIONS

Garfinkel, Simson; "Forensic Feature Extraction and Cross-drive Analysis", Digital Investigation Jun. 2006, pp. S71-S81.*
SLEUTHKIT.ORG, "The Sleuth Kit Informer—Jul. 2003".
SLEUTHKIT.ORG, "The Sleuth Kit Informer—Aug. 2003".
SLEUTHKIT.ORG, "The Sleuth Kit Informer—Dec. 2003".
NIST, Federal Info. Proc. Standards Pub., "Secure Hash Standard" Aug. 2002.
Garfinkel, "Advanced Forensic Format: An Open, Extensible Format for Disk Imaging", Chapter II of "Advances in Digital Forensics", IFIP Int. Conf. Digital Forensics, 2006.

* cited by examiner

*Primary Examiner*—Khanh B Pham
(74) *Attorney, Agent, or Firm*—Jacobs & Kim LLP; David Jacobs

(57) ABSTRACT

Computer-based systems and methods enable analysts to manage and explore the information that hard drives and other storage devices or sources of data may contain, and for extracting forensic features and performing cross drive analysis.

35 Claims, 24 Drawing Sheets

```
zblockHashID = select hashid from hashids
                   were hashval=hex2bin('bf619eac0cdf3f68d496ea9344137e8b')
count1 = select hcount from BlockHashes where ImageID=d
count2 = select ImgZBlocks from images where ImageID=d
count1 == count2
```

FIG. 9

| Extracted email addresses | Count on Drive #51 |
|---|---|
| ALICE@DOMAIN1.com | 8133 |
| BOB@DOMAIN1.com | 3504 |
| ALICE@mail.adhost.com | 2956 |
| JobInfo@alumni-gsb.stanford.edu | 2108 |
| CLARE@aol.com | 1579 |
| DON317@earthlink.net | 1206 |
| ERIC@DOMAIN1.com | 1118 |
| GABBY10@aol.com | 1030 |
| HAROLD@HAROLD.com | 989 |
| ISHMAEL@JACK.wolfe.net | 960 |
| KIM@prodigy.net | 947 |
| ISHMAEL-list@rcia.com | 845 |
| JACK@nwlink.com | 802 |
| LEN@wolfenet.com | 790 |
| natcom-list@rcia.com | 763 |

FIG. 10

| Extracted Email Addresses | Count on Drive #80 | Total drives with address |
|---|---|---|
| premium-server@thawte.com | 117 | 278 |
| server-certs@thawte.com | 104 | 278 |
| CPS-requests@verisign.com | 61 | 286 |
| personal-premium@thawte.com | 44 | 253 |
| personal-basic@thawte.com | 42 | 250 |
| personal-freemail@thawte.com | 40 | 250 |
| info@netscape.com | 36 | 58 |
| ANGIE@ALPHA.com | 32 | 1 |
| BARRY@BETA.com | 23 | 1 |
| CHARLES@GAMMA.com | 21 | 1 |
| DAVE.HALL@DELTA.com | 21 | 1 |
| DAPHNE@UNIFORM.com | 20 | 1 |
| ELLY@LIMA.com | 18 | 1 |
| FRANK@ECHO.com | 16 | 1 |
| HUGH@LIMA.com | 16 | 1 |
| IGGY@LIMA.com | 16 | 1 |
| GRETTA@XYZZY.com | 15 | 1 |
| VISTA@SNARF.com | 15 | 1 |

FIG. 11

| Extracted Email Address | Drives with address | Total count in corpus |
|---|---|---|
| CPS-requests@verisign.com | 286 | 64424 |
| server-certs@thawte.com | 278 | 32873 |
| premium-server@thawte.com | 278 | 31141 |
| Mouse.Exe@Mouse.Com | 262 | 493 |
| LMouse.Exe@LMouse.Com | 262 | 493 |
| personal-premium@thawte.com | 253 | 14660 |
| personal-freemail@thawte.com | 250 | 14843 |
| personal-basic@thawte.com | 250 | 14290 |
| inet@microsoft.com | 244 | 31456 |
| mazrob@panix.com | 221 | 3265 |
| java-security@java.sun.com | 200 | 1200 |
| java-io@java.sun.com | 198 | 413 |
| someone@microsoft.com | 195 | 6193 |
| bugs@java.sun.com | 192 | 351 |
| ca@digsigtrust.com | 173 | 36800 |
| name@company.com | 169 | 1763 |

| Drive | Unique SSNs | Total SSNs |
|---|---|---|
| Drive #959 | 260 | 447 |
| Drive #974 | 178 | 674 |
| Drive #696 | 33 | 872 |
| Drive #969 | 33 | 33 |
| Drive #690 | 8 | 14 |
| Drive #680 | 2 | 4 |

| # of drives with common email addresses | Number email addresses in common | |
| --- | --- | --- |
| | entire corpus | without "Lot SP" |
| 1 | 4,903,909 | 331,186 |
| 2 | 1,145,507 | 15,909 |
| 3 | 209,774 | 2,914 |
| 4 | 108,909 | 1,623 |
| 5 | 59,550 | 2,086 |
| 6 | 41,816 | 536 |
| 7 | 31,767 | 437 |
| 8 | 23,851 | 309 |
| 9 | 20,337 | 164 |
| 10 | 18,269 | 81 |
| 11 | 17,134 | 66 |
| 12 | 18,427 | 61 |
| 13 | 53,209 | 56 |
| 14 | 248 | 43 |
| ... | ... | ... |
| 250 | 2 | 2 |
| 253 | 1 | 1 |
| 262 | 2 | 2 |
| 278 | 2 | 2 |
| 286 | 1 | 1 |
| Total email addresses | 6,653,396 | 356,037 |

FIG. 14

| SSN | Found on Drives | Total Found |
| --- | --- | --- |
| 666666666 | 313, 427, 429, 430, 612, 627, 744, 770, 808 | 11 |
| 123456789 | 328, 343, 345, 350, 351, 700 | 8 |
| $SSN_1$ | 342, 343, 356 | 3 |
| 555555555 | 612, 690 | 8 |
| $SSN_1$ | 350, 357 | 2 |

FIG. 15

| Drive pair | $S_1$ | $S_2$ | $S_3$ |
|---|---|---|---|
| (612, 690) | 1.000 | 0.500 | 8.000 |
| (350, 700) | 1.000 | 0.167 | 0.667 |
| (350, 357) | 1.000 | 0.500 | 0.500 |
| (612, 744) | 1.000 | 0.111 | 0.444 |
| (351, 700) | 1.000 | 0.167 | 0.333 |
| (345, 350) | 1.000 | 0.167 | 0.333 |
| (342, 356) | 1.000 | 0.333 | 0.333 |
| (328, 700) | 1.000 | 0.167 | 0.333 |
| (342, 343) | 1.000 | 0.333 | 0.333 |
| (328, 350) | 1.000 | 0.167 | 0.333 |
| (343, 356) | 1.000 | 0.333 | 0.333 |
| (343, 700) | 1.000 | 0.167 | 0.333 |
| (343, 350) | 1.000 | 0.167 | 0.333 |
| ... | ... | ... | ... |

FIG. 16

|  | 5,796,217 CCN Corpus | | | 159,419 CCN Corpus | | |
|---|---|---|---|---|---|---|
|  | $S_1$ | $S_2$ | $S_3$ | $S_1$ | $S_2$ | $S_3$ |
| Max Score | 6817 | 3047 | 7,453,650 | 236 | 61 | 16,459 |
| (74, 77) | 748 | 319 | 394 | 18 | 9 | 9 |
| (171, 172) | 1487 | 742 | 7,456,650 | 7 | 3.5 | 3736 |
| (345, 350) | 671 | 129 | 2,608 | 203 | 52 | 885 |
| (350, 356) | 825 | 175 | 1,863 | 236 | 61 | 556 |
| (695, 698) | 334 | 13 | 3,861,670 | 1 | .055 | .055 |
| (716, 718) | 6817 | 3047 | 20,638 | 38 | 14 | 14 |
| (814, 820) | 571 | 122 | 997,384 | 3 | 1 | 1 |

FIG. 17

```
EMAIL|n.com; by E-mail at |CPS-requests@verisign.com|; or,by mail at Veri  (pos=3581932)
COOKIE|s","CachePrefix",2,"|Cookie:"|.HKLM,"Software\Micr  (pos=3949069)
EMAIL|n.com; by E-mail at |CPS-requests@verisign.com|; or,by mail at Veri  (pos=6982916)
EMAIL|enium Server CA|(0&.|premium-server@thawte.com|0.960801000002.2012  (pos=9441431)
EMAIL|enium Server CA|(0&.|premium-server@thawte.com|0.HS:R.x|^^n7c"v6^.V  (pos=9441602)
SUBJECT|:  .Sent:  .To:  .Cc:  .|Subject:  |.Importance:  .Sensit  (pos=35418278)
SUBJECT|sation:  .Keywords:  .|Subject:  |.Importance:  .Sensit  (pos=35423128)
COOKIE|txt.URL  .TgvH.z\gvH.|Cookie:SELJEJN@iwon.com/|.SELJEJN@iwon[1].txt  (pos=57277759)
COOKIE|jn@iwon[1].txt.URL  .|Cookie:SELJEJN@virtupay.net/|.SELJEJN@virtupay  (pos=57277809)
```

```
CREATE TABLE CodePageIDs (
    CodePageID int(11) not NULL auto_increment,
    CodePage varchar(255),
    Primary key (CodePageID),
    key (CodePage)
)
```

```
CREATE TABLE drives (
   DriveID int(11) NOT NULL auto_increment,
   Manuf varchar(255) NOT NULL default '',        # if known
   Model varchar(255) NOT NULL default '',        # if known
   SN varchar(255) NOT NULL default '',           # if known
   Heads int(11) default NULL,
   SectorsPerTrack int(11) default NULL,
   DateOfManufacture datetime,                    # printed on drive
   DateAcquired     datetime,                     # by customer, not Alix
   source text,             # source of the drive
   country varchar(2),      # ISO 3166 country code where drive was acquired
   caseNum text,            # site-specific
   notes text, DOA enum('Y','N') default 'N', # 'Y' if drive is dead and  cannot image
   AUID blob,                    # 128-bit random accession identifier
    PRIMARY KEY  (driveid),
    KEY sn (sn)
) ENGINE=MyISAM DEFAULT CHARSET=latin1;
```

```
CREATE TABLE images (
  ImageID int(11) not null auto_increment,
  AUID blob not null,           # not DriveID; the AUID gives site-independence.
  Hash blob,                    # of the uncompressed ISO image.
  HashAlg varchar(255),
  DriveIdent varchar(255) default NULL,
  ImageEquip varchar(255) default NULL, # what was used to create image
  ImageTime datetime,
  ImageTimeTZ varchar,
  ImgSeconds int,
  ImgBlocks int,
  ImgBadBlocks int,             # number of bad blocks
  BadBlockCode blob,
  ImgNotes text,

These are set during Feature Extraction:

ImgZBlocks int,               # number of zblocks
  primary key ImageID,
  key 'AUID',
  key hash,
  key ImageBlocks
) Engine=myisam default charset=latin1;
```

```
CREATE TABLE BlockHashes (
    HashID int not null,          # which hash was seen
    ImageID int not null,         # in which image was it seen?
    hcount int not null,          # how many copies were seen?
    primary key (HashID,ImageID),
    key (DriveID,HashID)
);
```

```
+---------+------------------------------------------+------------+
| HashAlg | HEX(hashval)                             | contentsID |
+---------+------------------------------------------+------------+
| '5'     | 'bf619eac0cdf3f68d496ea9344137e8b'       |          1 |
| '1'     | '5c3eb8006642c0002bc3dcc7ca4ab6efad7ed4ae5' |        1 |
+---------+------------------------------------------+------------+
```

FIG. 24

```
CREATE TABLE BlockHashes (
  HashID int not null,                # which hash was seen
  ImageID int not null,               # in which image was it seen?
  hcount int not null,                # how many copies were seen?
  primary key (HashID,ImageID),
  key (DriveID,HashID)
);
```

FIG. 25

```
CREATE TABLE fe_NamedAndPlaces (
  NameAndPlaceID int(11) not null auto_increment,
  ImageID int(11),              # image where found
  BlockNum int(11),             # block where found
  Found varchar(255),           # what was found, as found on the disk
  ProbableCodePageID int(11),   # recognizer's guess as to best code page primary key (creditCardNumberID),
  key (imageID,blockNum),
  key (number)
);
```

FIG. 26

```
CREATE TABLE fe_NamedAndPlaces (
  NameAndPlaceID int(11) not null auto_increment,
  ImageID int(11),              # image where found
  BlockNum int(11),             # block where found
  Found varchar(255),           # what was found, as found on the disk
  ProbableCodePageID int(11),   # recognizer's guess as to best code page primary key (creditCardNumberID),
  key (imageID,blockNum),
  key (number)
);
```

FIG. 27

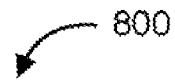

```
CREATE TABLE dirnames (
   dirnameid int(11) NOT NULL auto_increment,
   dirname varbinary(255) default NULL,
   PRIMARY KEY  (dirnameid),
   KEY dirname (dirname)
) ENGINE=MyISAM DEFAULT CHARSET=latin1;
```

FIG. 28

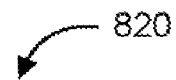

```
CREATE TABLE filenames (
   filenameid int(11) NOT NULL auto_increment,
   filename varbinary(255) default NULL,
   PRIMARY KEY  (filenameid),
   KEY filename (filename)
) ENGINE=MyISAM DEFAULT CHARSET=latin1;
```

FIG. 29

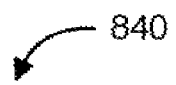

```
CREATE TABLE fileextensions (
   fileExtensionid int(11) NOT NULL auto_increment,
   fileExtension varbinary(255) default NULL,
   PRIMARY KEY  (fileExtensionid),
   KEY fileExtension (fileExtension)
) ENGINE=MyISAM DEFAULT CHARSET=latin1;
```

CREATE TABLE DirectoryEntries (
   DirectoryEntryID int(11) NOT NULL auto_increment, these entries define a complete path name on a disk:

ImageID int(11) NOT NULL default '0',
   RootBlock int(11) not null,    # block ID, 0 for file system root
   DirnameID int(11) not null,
   FilenameID int(11) not null,

File metadata:

ctime datetime default NULL,
   mtime datetime default NULL,
   atime datetime default NULL,
   length int(11) default NULL,
   FileExtensionID int(11) default NULL,        # redundant with filenameid

File contents info:

HashID int(11) default NULL,

PRIMARY KEY  (directoryentryid),
   KEY imageid (imageid),
   KEY dirnameid (dirnameid),
   KEY filenameid (filenameid), KEY ctime (ctime),
   KEY mtime (mtime),
   KEY atime (atime), KEY HashID (HashID),
   KEY length (length),
   KEY fileextensionid (fileextensionid),
) ENGINE=MyISAM DEFAULT CHARSET=latin1;
```

FIG. 31

```
                create table workQueues (
                    workQueueID int(11) not null auto_increment,
                    whenEntered datetime,
                    whenStarted datetime,
                    timesStarted int,
                    whenEnded datetime,
                    description text,
                    sql text,
                    key workQueueID,
                    key whenEntered,
                ) Engine=myisam default charset=latin1;
```

FIG. 32

```
time_t now = time(0);
char bad_block_buf[512];

RAND_pseudo_bytes(bad_block_buf,sizeof(bad_block_buf));
snprintf(bad_block_buf,sizeof(bad_block_buf),"BAD BLOCK%c%s",0,ctime(&now));
```

FIG. 33

| Name | Example | Meaning |
|---|---|---|
| segsize | 1048576 | The number of bytes, stored as an ASCII decimal number, that are in each segment. |
| seg0 | ... | The first segment in the file. |
| seg1 | ... | The second segment in the file. |
| segN | ... | The last segment in the file. |
| filesize | 3342343 | The number of bytes in the file. |
| compression | zlib | The compression algorithm used to compress the segments. By default, no compression algorithm is used. "zlib" means that each segment is independently compressed with the zlib encryption algorithm. |
| a.*property* | | An accession property. For example, a.manufacturer would be the key used for the drive Manufacturer property. |
| i.*property* | | An image property. For example, i.Blocks would be the key used for the Blocks property. |

FIG. 34

FORENSIC FEATURE EXTRACTION AND CROSS DRIVE ANALYSIS

CROSS-REFERENCE TO RELATED APPLICATIONS

The present application is a continuation-in-part of U.S. patent application Ser. No. 11/456,770, filed on Jul. 11, 2006, entitled "Methods and Systems for Storage Device Imaging and Searching," incorporated herein by reference, which claims the benefit of U.S. Provisional Patent Application Ser. No. 60/698,741, filed on Jul. 13, 2005, entitled "Methods and Systems for Storage Device Imaging and Searching," also incorporated herein by reference. The present application also claims the priority benefit of U.S. Provisional Patent Application Ser. No. 60/805,989, filed on Jun. 28, 2006, entitled "Forensic Feature Extraction and Cross-Drive Analysis," incorporated herein by reference.

FIELD OF THE INVENTION

The present invention relates generally to the field of digital information processing and computing, and, more particularly, to methods, devices, systems and software for enabling forensic analysts to explore and analyze information contained on computer hard drives and other digital storage media.

BACKGROUND OF THE INVENTION

Police, military, and other intelligence organizations have long relied on data harvested from computers seized in security operations to gain information about criminal or terrorist activity and other security threats. Personal computer hard drives and other storage media frequently contain a wealth of files and other useful information. With the scope and intensity of security activities being dramatically increased worldwide, United States and other governmental security operations, overseas and domestic, are collecting far more hard drives and other media than can possibly be processed and analyzed using conventional methods, techniques and technology.

Accordingly, a need exists for, and it would be desirable to provide, methods, systems, devices and software that would expedite the management, analysis and harvesting of hard drives and other digital storage media obtained by security operations and other activities.

SUMMARY OF THE INVENTION

The present invention addresses this need and others by providing methods, systems, devices and a software architecture that enables analysts to manage and explore the information that hard drives and other storage devices or sources of data may contain, extract forensic features for analysis, and perform cross drive analysis to identify social networks and perform other functions.

In the following discussion, one embodiment of such an architecture is referred to variously as "Alix" or the "Alix architecture". While some of the embodiments are described in the context of analysis of hard drives and networks of hard drives, the methods and systems described herein are equivalently applicable to analysis of other types of digital information storage devices (whether disk drives or other forms) or digital information sources, such as via connection to the Internet or other networks.

In the following discussion, a set of disks or other digital information storage devices or digital information sources to be analyzed are as a "corpus" of information.

One aspect of the invention (and many variations and different techniques are described hereinafter and are within the spirit and scope of the invention) includes:

(1) creating a disk image for each disk in a corpus;

(2) for each imaged disk, generating metadata, including accession data, feature extraction data, and other data as described herein;

(3) indexing and storing disk images and metadata in a network-accessible repository, the network including analytical and search engines and other resources that allow analysts to access stored disk images and metadata, and encompass tools to conduct analyses on a single drive within a corpus, across a subset of drives within a corpus, across an entire corpus, and across a plurality of corpora.

The described systems and techniques allow an analyst, for example, to accomplish the following tasks, among others:

(1) identify "hot drives," i.e., drives of particular forensic interest, based on features extracted from the drives in the corpus;

(2) identify the owner of a drive within a corpus;

(3) identify subsets of drives within a corpus that are part of a social network, or otherwise related to each other, based on a degree of commonality of selected features extracted from the drives; and (4) determine whether a particular drive belongs to a social network to which a second drive has been identified as belonging.

These and many other aspects, features, examples, embodiments, practices and implementations of the invention are discussed in detail below in conjunction with the attached drawing figures.

BRIEF DESCRIPTION OF THE DRAWINGS

The following brief descriptions of the drawings are provided as a general guide and are not intended to limit the scope of the invention. In particular, each description, other than descriptions referring to the prior art, will be understood to refer to illustrative examples of systems, techniques, data structures, code listings, and the like, according to various aspects of the invention.

FIG. 9 shows a code listing illustrating the use of the zblocks field as a check on a block hash.

FIG. 10 shows a histogram of the top 15 email addresses found on a drive in a sample corpus of hard drives.

FIG. 11 shows a histogram of the top 15 email addresses found on another drive in the sample corpus of hard drives.

FIG. 12 shows a histogram of the 15 email addresses that are on the largest number of drives in the sample corpus of hard drives.

FIG. 13 shows a table listing the disk images containing the largest number of extracted social security numbers (SSNs) after obvious test data have been suppressed.

FIG. 14 shows a histogram analysis of different correlations of email addresses found on drives in the sample corpus of hard drives.

FIG. 15 shows a table setting forth the results of a multi-drive correlation of social security numbers (SSNs).

FIG. 16 shows a table setting forth the results of three scoring functions applied to some of the drive pairs shown in FIG. 15.

FIG. 17 shows a table noting the maximum score for all drives.

FIG. 19 shows an exemplary feature file according to an aspect of the invention.

FIG. 20-32 show a series of code listings for generating data tables that can suitably be used to implement various aspects of the invention.

FIG. 33 shows a pseudocode listing, illustrating a technique for creating a 512-byte bad block sector.

FIG. 34 shows a table of key definitions for the Alix IMG file format (also variously referred to herein as "AFF" file format).

DETAILED DESCRIPTION

The following detailed description of the invention is organized into the following sections:

A. Overview and Technical Background
B. Examples of Architecture and Methods
C. Additional Methods According to the Invention
D. Conclusion Those skilled in the art will appreciate that the detailed description set forth herein is not intended to be limiting, but to be illustrative of various implementations, examples, embodiments and practices of the invention. It will be understood that many other modifications, variations and implementations of the invention are possible and are within the spirit and scope of the invention. For example, various aspects of the invention described above and claimed in the patent claims appended hereto can be practiced without using the complete architecture (e.g., the Alix architecture) described herein. Those skilled in the art will also appreciate that the methods, techniques, devices and systems described herein can be embodied at least in part in computer software, computer hardware, or some combination thereof.

A. Overview and Technical Background

Using the invention, an analyst can rapidly assess a large collection of disk drives or other digital media and determine which ones warrant or could benefit from additional investigation. The system can look for patterns that emerge between drives. In addition, the system provides a repository for collected drives and media, automating time-consuming and tedious tasks such as drive collection, imaging, cataloging, and image transport.

The invention can be practiced in conjunction with conventional personal computer (PC) or workstation hardware and software, as well as conventional digital processor networks and storage networks. Examples of platforms and environments in which the invention can be practiced are shown by way of background in FIG. 1 (Prior Art) and FIG. 2 (Prior Art). It will be understood by those skilled in the art that the described methods and systems can be implemented in software, hardware, or a combination of software and hardware, using conventional computer apparatus such as a personal computer (PC) or equivalent device operating in accordance with, or emulating, a conventional operating system such as FreeBSD, Microsoft Windows, Linux, or Unix, either in a standalone configuration or across a network. The various processing means and computational means described below and recited in the claims may therefore be implemented in the software and/or hardware elements of a properly configured digital processing device or network of devices.

Figure 1:
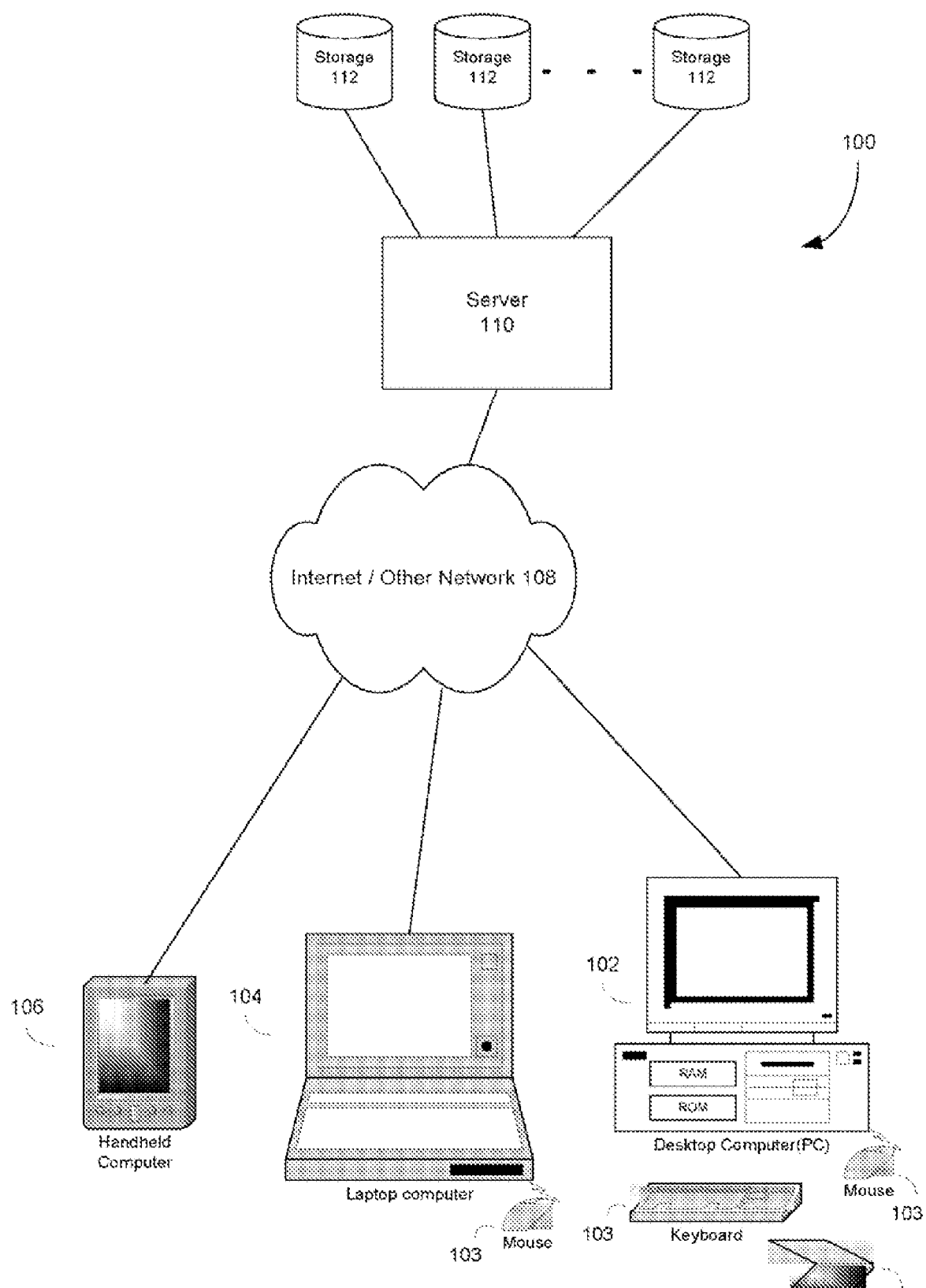
FIGS. 1 and 2 (Prior Art) show, respectively, diagrams of a conventional network architecture and a conventional personal computer (PC) architecture that may be used to implement various aspects of the invention, as described herein.

Methods, devices or software products in accordance with the invention can operate on any of a wide range of conventional computing devices and systems, such as those depicted by way of example in FIG. 1 (e.g., network system 100), whether standalone, networked, portable or fixed, including conventional PCs 102, laptops 104, handheld or mobile computers 106, or across the Internet or other networks 108, which may in turn include servers 110 and storage 112.

Figure 2:
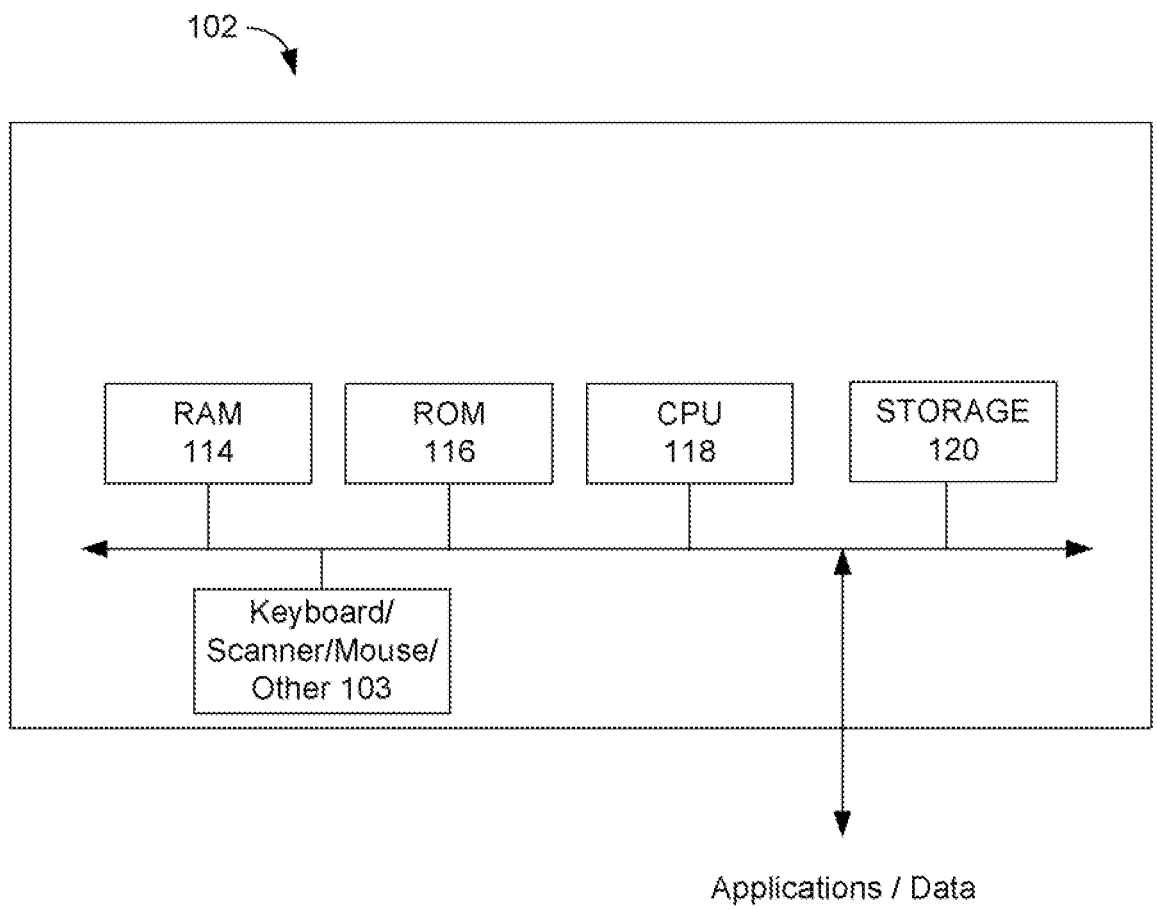

Consistent with conventional computer software and hardware practice, a software application configured in accordance with the invention can operate within, e.g., a PC 102 like that shown in FIG. 2, in which program instructions can be read from CD ROM 116, magnetic disk or other storage 120 and loaded into RAM 114 for execution by CPU 118. Data, in addition to data from digital disk drives, digital storage devices or other digital information sources accessed for analysis, can be input into the system via any known device, or means, including a conventional keyboard, scanner, mouse or other elements 103. Thus, among other forms, the invention can be embodied as a computer software product comprising a computer-readable medium having encoded thereon or therein computer-readable software code instructions, whether the medium is a CD-ROM, memory key (RAM), custom ASIC chip, ROM chip, or whether the software product is downloadable or up-loadable from a local or remote source such as a WAN, LAN, or the Internet. These and many other forms of software products are well known in the technology of digital processors, computers and networks. The invention could also be equivalently embodied in hardware, such as in a custom ASIC chip or in ROM, using known computer techniques.

As described in further detail below, the system provides a number of functions, including the following:

(1) Disk image acquisition, archiving and management. An aspect of the invention provides a unified system that allows the contents of captured drives to be rapidly imaged, indexed and archived. Forensic experts throughout an organization can download these images to their workstations and analyze them with traditional tools such as Encase, FTK and TSK.

(2) Large-scale disk indexing. Another aspect of the invention involves constructing a large-scale index of the human names, email addresses, and documents located on all of the images that have been archived. These images can then be rapidly searched for information of interest.

(3) Hot drive identification. Another aspect of the invention comprises automatically identifying drives likely to be of interest to an analyst; for example, drives containing large amounts of financial information.

(4) Cross-drive analysis (CDA). Another aspect of the invention provides cross-drive analysis techniques that can be used for automatic identification of social networks and other functions.

According to an aspect of the invention, the described systems and techniques are implemented using a multi-user, plug-in architecture that implements an open, extensible application programming interface (API). This API can be used by system developers and simultaneously exposed to end-users, allowing users to write their own components and share in development and implementation of the technology.

Aspects of the invention, and other techniques, practices and examples in accordance with the invention are discussed in detail below.

B. Examples of Architecture and Methods

The following description of an architecture and methods according to the invention is divided into the following subsections:

1. Examples of Components
2. Conventions and Nomenclature
3. Drive Accession
4. Drive Imaging
5. Image Importing
6. Feature Extraction
7. The Analyst Workstation and the Analysis Engine
8. Examples of Database Schema
9. Examples of Image File Formats It is noted that these section headings are provided to help organize the present discussion and are not intended to limit the scope of the present invention. As noted elsewhere herein, a wide range of variations and modifications is possible and within the spirit and scope of the present invention. For example, the techniques noted herein can be practiced without using the architecture described by way of example in this document.

1. Components

Figure 3:
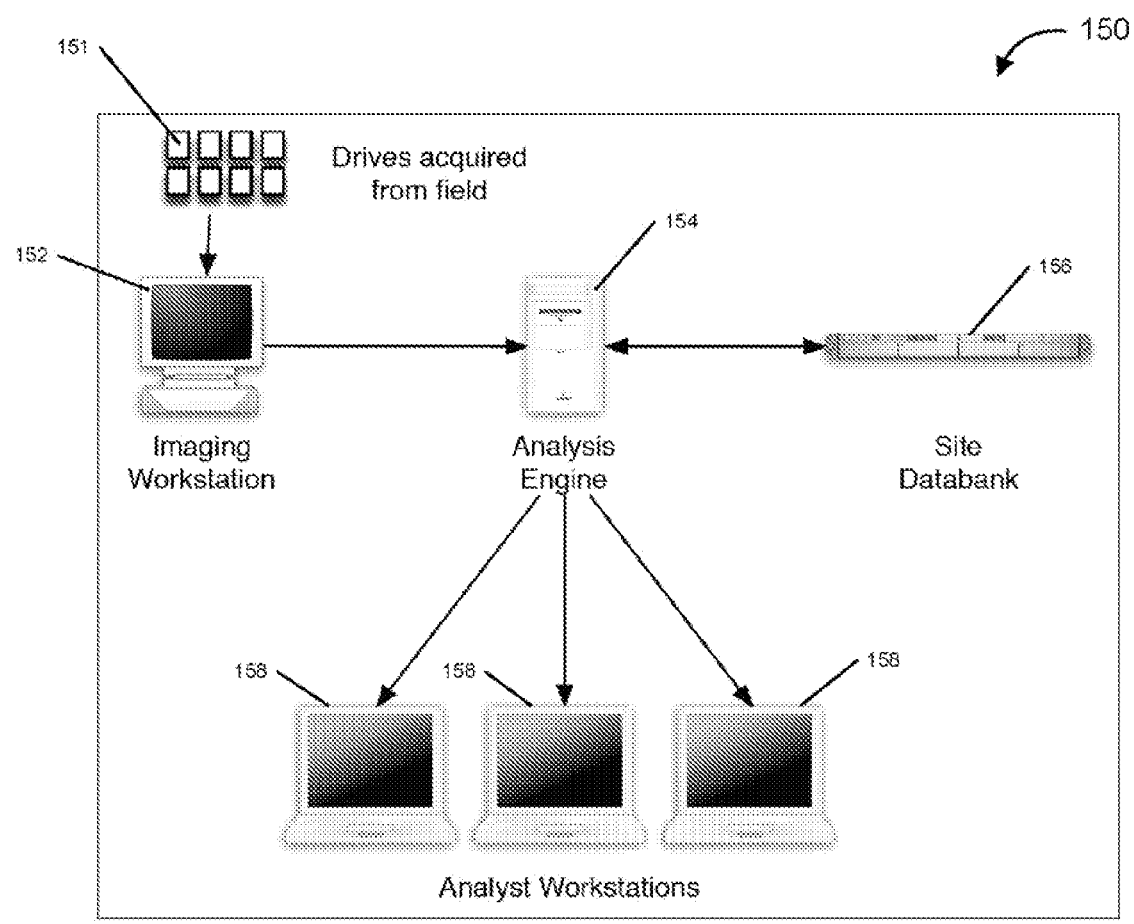
FIG. 3 shows a schematic block diagram of a system according to one aspect of the invention, including an imaging station, an analysis engine, a site databank, and an analyst workstation.

In one embodiment of the invention, as shown in FIG. 3 attached hereto, one form of architecture 150 that can be used in the invention (e.g., the Alix architecture) comprises four components: an Imaging Workstation 152, an Analysis Engine 154, a Site Databank 156 and an Analyst Workstation 158 that are used to image, search, and otherwise manage drives 151 acquired from the field. As used herein, the term "drives" generally refers to devices used to store digital information in machine-readable form, including computer hard drives, flash drives, handheld devices, and the like. As described below, various modification and variations in this architecture are possible and are within the spirit and scope of the invention.

The Imaging Workstation 152, also referred to herein as the "Imaging Station," is a computer that is used to copy information from physical drives 151 and prepare it for incorporation into the Site Databank 156. The Imaging Workstation 152 can be equipped with multiple interfaces for reading ATA, SATA, and SCSI hard drives, as well as a wide variety of other types of storage devices, including flash-based memory devices and the like. Imaging Workstations 152 can also read disks containing image files that were acquired at other locations.

According to the present aspect of the invention, the Imaging Workstation 152 is implemented using an Intel IA32-based computer running the FreeBSD operating system. However, it will be apparent from the present discussion that other platforms and operating systems can be used equivalently as well without departing from the scope of the present invention. The Imaging Workstation 302 sends its acquired images of drives 151 to the Site Databank 156 using an image synchronization protocol.

If desired, a document scanner (not shown) may be provided as part of the Imaging Workstation 152, so that if any paper documentation accompanies a drive, the information can be readily scanned into the system. If a scanner is used, the Imaging Workstation 152 can be run using the Linux operating system, which currently has better scanner and OCR support than does FreeBSD. For example, ABBYY Software House of Fremont, Calif. has a developer package that runs under Linux.

The Analysis Engine 154 imports images into the Site Databank 156 and executes queries for a human analyst/operator. According to the present aspect of the invention, the Analysis Engine 154 is implemented using an Intel IA32-based or Advanced Micro Devices AMD64-based computer running the FreeBSD operating system and the Apache2 web server. According to a further aspect of the invention, the Analysis Engine 154 runs automatically in response to timed events and queries from an Analyst Workstation 158.

The Site Databank 156, also referred to herein as the "Databank," is a data warehouse that is used to store all information for a given Alix installation. The Site Databank 156 can run on a single server. According to the present embodiment of the invention, the Site Databank 156 is implemented using an IA32 or AMD64-based computer running the FreeBSD operating system and the MySQL web server. The Site Databank 156 can run on the same physical hardware as the Analysis Engine 154, although greater performance will be achieved by running it on a separate CPU connected to the Analysis Engine 154 through gigabit Ethernet or a dedicated Firewire interface.

An Analyst Workstation 158 provides a trained individual with a means for running searches on, and retrieving information from, the Site Databank 156. Ideally, an Analyst Workstation 158 will interact with the Site Databank 156 using a standard Web browser. According to the present aspect of the invention, the Analyst Workstations 158 may suitably be implemented as PCs running either Microsoft Windows XP or Linux.

The Imaging Station 152 supports disconnected operation, allowing it to be used in the field, such as by running on a laptop, or in a remote facility. The Analysis Engine 154 generally requires real-time access to the Site Databank 156. It will be seen that, together, the Site Databank 156, Analysis Engine 154, and Analyst Workstation 158 resemble a three-tier client/server system, in which the Site Databank 156 provides a database management function, the Analysis Engine 154 provides a process management function, and the Analyst Workstation 158 provides a user system interface. However, it will be appreciated that the techniques described herein may be practiced using other configurations.

Figure 4:
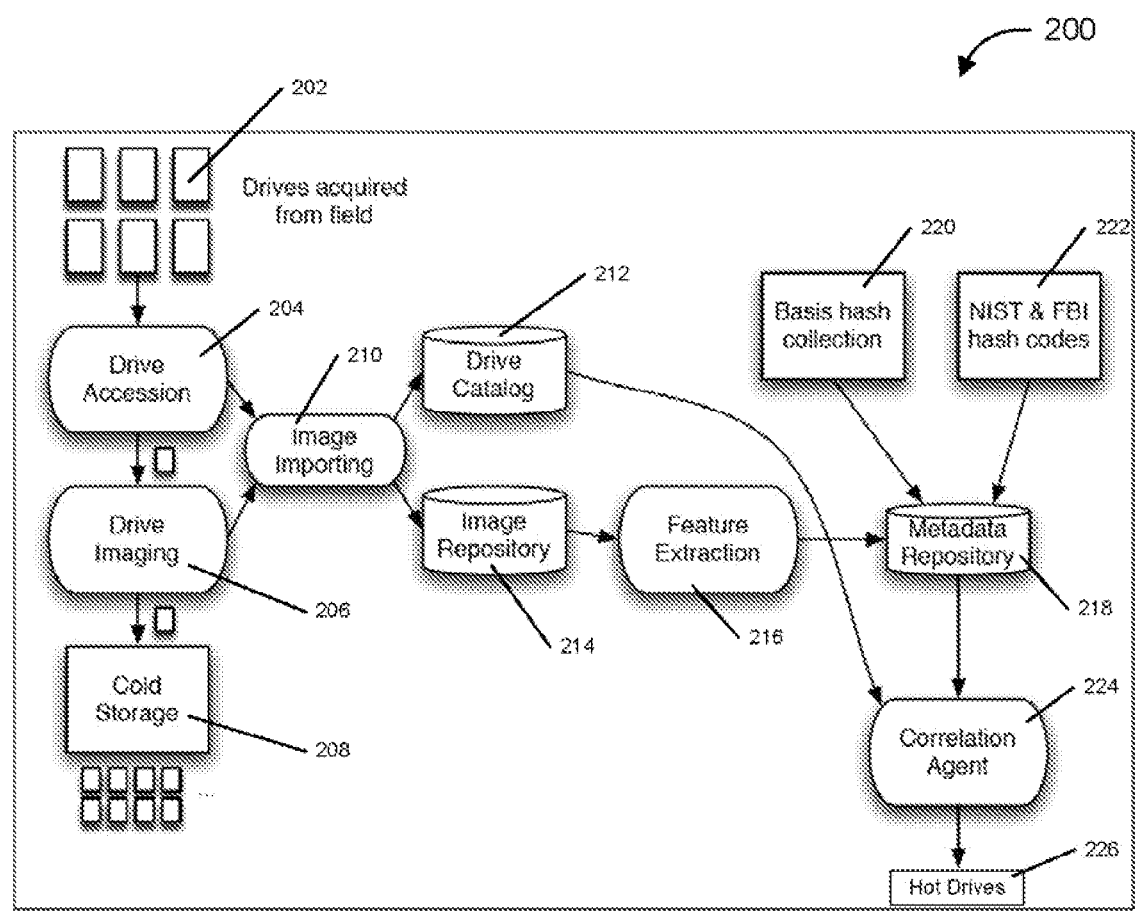
FIG. 4 shows a functional block diagram of a system architecture according to a further aspect of the invention, providing a high-level illustration of the flow of information and system operations.

FIG. 4 is a functional block diagram of the Alix architecture 200, providing a high-level illustration of the flow of information and system operations. Drives acquired from the field 202 first undergo a drive accession process 204 and a drive imaging process 206. The physical drives are then placed into cold storage 208. The drive accession information and drive images then undergo an image importing process 210, in which a drive catalog 212 and an image repository 214 are populated. The drive image repository 214 undergoes a feature extraction process 216, and the resulting information is used to populate a metadata repository 218. The metadata repository 218 is supplemented with a Basis hash collection 220, as well as NIST and FBI hash codes 222. A correlation agent 224 then accesses the drive catalog 212 and metadata repository 218 to identify "hot" drives 226, that is, drives determined to be of particular forensic interest.

Those skilled in the art will understand that the hardware components and underlying software of these elements can utilize commercially available or otherwise known techniques, implemented in accordance with the teachings of the invention. The physical drives by themselves, for example, form no part of the present invention. The Basis hash collection block 220 and the NIST & FBI hash codes block 222 refer to compilations of hash values available from other sources.

2. Conventions and Nomenclature

Site: As used herein, the term "Alix site" or "site" refers to an installation of the Alix software comprising one or more Imaging Stations, one or more Analysis Engines, a Site Databank, and one or more Analyst Workstations.

Accession: The term "Accession" refers to the process of assigning a unique identifier to a drive and recording that identifier in the Alix database. The Accession process may include other steps, such as placing a barcode on a physical drive.

Deleted File: The term "deleted file" refers to a specific file, identified by fileID, that is present on the disk, but that has been deleted.

Feature Extraction: The term "Feature Extraction" refers to first-order analysis of an imported image. Feature Extraction includes counting the number of zblocks, computing the hash of every block in the image, tabulating files, and performing other tasks, as described in further detail below.

Imaging: The term "imaging" refers to the process of copying the data off the drive and into Alix. Each time this process is performed, a drive image is created. A drive can be imaged multiple times. Depending on the drive's conditions that are set before the drive is imaged, these multiple image attempts can result in the same or different image files being created.

Importing: The term "importing" refers to the process of incorporating a drive image into the Alix database. An image cannot be incorporated until the drive that produced the image has been Accessioned.

Allocated File: The term "allocated file" refers to a specific file, identified by fileID, that is present and not deleted on a disk image.

zblock: The term "zblock" refers to a 512-byte block that is filled with NULs. A zblock can be characterized as follows:
MD5 (zblock.img)=bf619eac0cdf3f68d496ea9344137e8b
SHA1(zblock.img)=5c3eb80066420002
bc3dcc7ca4ab6efad7ed4ae5

2.1 Identifiers

Identifiers are site-specific ordinals that exist to identify large entities. The identifier is then used as a key into databases for queries.

An identifier table is a database table that is used to hold the collection of identifiers used by a specific site.

Identifiers always end with the string ID, as in FileID or HashID. The corresponding identifier table always ends in the string s, as in FileIDs or HashIDs.

The following identifiers are defined herein:

CodePageID: A table that maps code pages to ordinals used by Alix. According to an aspect of the invention, this identifier table is read-only and is distributed as part of the Alix distribution.

DirectoryEntryID: A complete list of all the directory entries that were observed on a specific disk image. The FileIDs table contains all meta-information observed for the file. A DirnameID of 0 and a FilenameID of zero indicates that the file's name is not known, as might be the case with Unix inodes that are not connected to a specific directory.

FileNameID: A specific file name. File names are considered to be case sensitive. Thus, command.com and COMMAND.COM have different FileNameIDs. Experience indicates that there is a difference between finding command.com on a hard drive and finding COMMAND.COM. It appears that COMMAND.COM was put on the disk by older versions of FORMAT, while command.com was put there by newer versions. Thus, if one encounters command.com on an old drive, this may indicate that it was reformatted on a modem computer for the explicit purpose of hiding information.

FileExtID: File extension, such as txt, doc, and xls. Extensions are normalized to lower case and do not include the leading period. Note that these extensions only reflect the name that was found in a directory, and are not indicative of the file's actual contents.

DirNameID: A specific directory name, also considered to be case sensitive. Typical DirNames are root, /, and /Windows. Directory names are normalized to use the forward slash as the directory separator, but are displayed in whichever form the analyst prefers.

DriveID: An identifier for a specific physical drive.

ImageID: An identifier corresponding to a specific image that was acquired from a drive. When both the hard drive and the imaging workstation are healthy, it is expected that all images acquired from the drive will be the same. However, when a hard drive is failing or when the imaging workstation is in disrepair, it is possible that multiple imaging operations will result in different images.

HashID: Rather than consume 16 or 20 bytes for an MD5 or SHA1 hash in every database table, the database has a single table that maps hash codes to a HashID. Each row of the table consists of a (HashID, HashAlgorithm, HashCode) tuple. The HashCode is stored as a blob for efficiency.

HttpCookieID: Identities a cookie that was found on an image. HTTP Cookies are stored in a normalized form.

In the nomenclature used herein, intercaps are typically used, rather than underbars. The exception is the feature extraction tables, which are named fe_feature. Persistent names begin with a capital letter.

3. Drive Accession

Each drive that is accessioned must have a name that is unique to the Site. These names can be provided by the customer or assigned by Alix. Candidates for drive names include: the manufacturer serial number; an identifier provided by the party that acquired the drive; a randomly-generated identifier; or other suitable identifying name.

It is useful for a technician to be able to look at the drive and determine the drive's identifier. One of the problems with using manufacturer-provided serial numbers is that disk drives tend to have many serial numbers on them. For example, the circuit board can have a serial number, as can the connector, the drive assembly, and the like. Sometimes, drives that are sold by resellers are given additional serial numbers.

Although it may be tempting to record all of the serial numbers that are present on a typical drive, in practice, this is neither necessary nor useful.

It has been found that it is useful to record at least the following information when drives are accessioned:

Manufacturer: If it can be determined, otherwise NULL.

ModelNumber: There are times when unrelated projects have need for drives of a specific manufacturer and model number. By recording this information, the Alix system makes it possible to rapidly meet these requests.

SerialNumber: The manufacturer-provided serial number, if visible, otherwise NULL.

Heads: The number of drive heads, as written on the label. If nothing is written on the label, this field should be NULL.

SectorsPerTrack: If written on the label. When using older drives, motherboards and operating systems, it is possible to use a drive in an improper configuration. That can result in the disk sectors being jumbled, preventing file systems from being able to interpret the information on the disk.

DateOfManufacture: A date that is present on the drive indicating the day when the drive was manufactured. If only a year is found, the day should be set to be January 1 of that year.

DateAcquired: The date the drive was acquired from the field.

Source: A free-format text field.

CaseNum: Case number, a free-format text field.

DNotes: A free-format text field for notes about the disk drive.

DOA: True if an image was attempted, but failed. False if the drive was successfully imaged. NULL if no attempt has been made.

AUID: A 128-bit unique accession number that is created for this drive.

These values are stored in the drives table, as described below. It should be noted that other accession values may be stored, as desired, with departing from the scope of the present invention.

4. Drive Imaging

Drive Imaging is the process of taking data off each physical hard drive to be analyzed and placing it into a disk file, called an image file, on the Imaging Station. There are a number of advantages to working with an image file. For example, older hard drives are quite small. By imaging the disk and then working with an image file, workflow is accelerated. In addition, more than one person can access an image file at a time. Image files can be copied and backed up. If a hard drive fails, the analyst still has the image file. Still further, while as a general matter one can only have a few hard drives connected to a given computer at a given time, you can have any number of image files on a computer.

A particular goal of imaging is to make a complete and perfect copy of all of the data on the hard drive. This can be complicated by several factors. For example, if the hard drive is in poor condition, it may not be readable. Alternatively, one may get different data every time one reads the drive. In addition, the hard drive may contain information that is not accessible using standard ATA or SCSI read commands. This might include information that is in bad blocks, hidden information in vendor-specific areas, and information in the host-protected area (HPA) if the hard drive is configured with an HPA.

Image file formats are discussed in further detail below. As a general matter, there are a number of file formats of interest, as follows:

Raw or ISO: A block-for-block copy of data found on the original hard drive. Blocks that could not be read from the disk must be padded in the image file. Although NULs (zblocks) are commonly used for padding, there are advantages to using a different block that is clearly bad data.

Expert Witness: The file format used by the original EnCase forensics application program. This is a documented file format. It supports file compression and limited metadata.

Expert Witness 5.0 (and its progeny): The more recent file format(s) used by Encase. It supports file compression and more metadata.

There is now discussed the hardware required to image a hard drive. Hard drives to be imaged typically come in many shapes and sizes. Among the commonly encountered drive formats are 3.5" ATA, 2.5" ATA, 3.5" SCSI, 3.5" SATA (Serial ATA), and 3.5" SSCSI (Serial SCSI). The general characteristics of these are as follows:

3.5" ATA: The type of drive typically present in current desktop PCs. This drive has a 41-pin male connector, a set of pins for jumpers, and a Molex 8981 series power connector that provides power and ground.

2.5" ATA: The type of drive typically present in current laptop and notebook computers. This drive has a 43-pin male connector for data and power.

3.5" SCSI: A type of drive present in many servers in the 1990s, now generally falling out of favor.

3.5" SATA: A type of drive present in newer high-end desktop machines and servers. These drives have a 6-pin connector for data and a standard Molex connector for power.

Other types of drives less likely to be encountered include: 5" ATA and SCSI drives, which are substantially like currently used 3.5" drives; 5" hard drives, typically having a proprietary connector; and 3.5" proprietary hard drives from the 1980s, present in both early laptops and in some desktop machines of that era.

Data and power connections to the above-described drives can be made using known techniques, adapters and power supplies, which may include USB adapters, Firewire adaptors, and various data and power connectors. On typical 3.5" disk drives, for example, there is a 43-pin ATA connector, a small area of configuration jumpers, and a Molex power connector. The connector should be oriented so that the notch goes up and the "missing pin" goes down. Some connecting cables have a notch but no missing pin, while some have a missing pin but no notch.

On some drives, such as 2.5" drives, a USB adapter can be used to provide the required +5V power. Some Firewire adapters can also be used, configured to snap onto the back of a 3.5" disk drive and providing two Firewire connectors, allowing several Firewire devices to be chained together. Where such an adapter requires +5V power, it can be taken from the hard drive's power using a pass-through pair of Molex connectors. Other adapters can be purchased or constructed using known techniques, such as an adapter that enables a 2.5" laptop hard disk drive to be connected to a 3.5" IDE adapter.

The software used to control copying or writing of data to or from the disk drive can be written in any of a range of software languages, such as C, Python or Perl, in accordance with known programming techniques. Experimentation suggests that substantially equivalent performance can be achieved using code written in any of these various languages.

There are many ways to image drives. The Alix system currently supports the following:

An ATA drive can be attached to a computer using a Firewire adapter. The Firewire disk driver is used to access the drive's raw partition, and the image is copied off block-by-block. This is a highly efficient approach, as the Firewire slides that the Applicant has tested appear to function better than the USB slides.

An ATA drive can be attached to a computer using a USB adapter. The USB disk driver is used to access the raw partition.

An ATA drive can be connected directly to an ATA interface on a computer's motherboard or a PCI card. This works well, but requires that the adapter be detached and reattached to the operating system. The FreeBSD operating system supports this with the atacontrol command.

A SCSI drive can be connected directly to a host SCSI interface, either on the computer's motherboard or on an ISA card. This works well, but requires that the SCSI device be detached and reattached to the computer's operating system. The FreeBSD operating system supports this with the camcontrol command.

A number of additional drive imaging techniques can be implemented. For example, the image can be imported using a hand-held disk imaging device designed for use by law enforcement or intelligence-gathering personnel, or the image can be read from a flash card or stick using a flash reader.

4.1 Block Copying

Using currently available equipment and techniques, it typically takes between 5 and 30 minutes to copy all of the data off a disk drive. This time is relatively constant because higher capacity drives generally spin faster and have faster transfer times than lower capacity drives.

Figure 5:
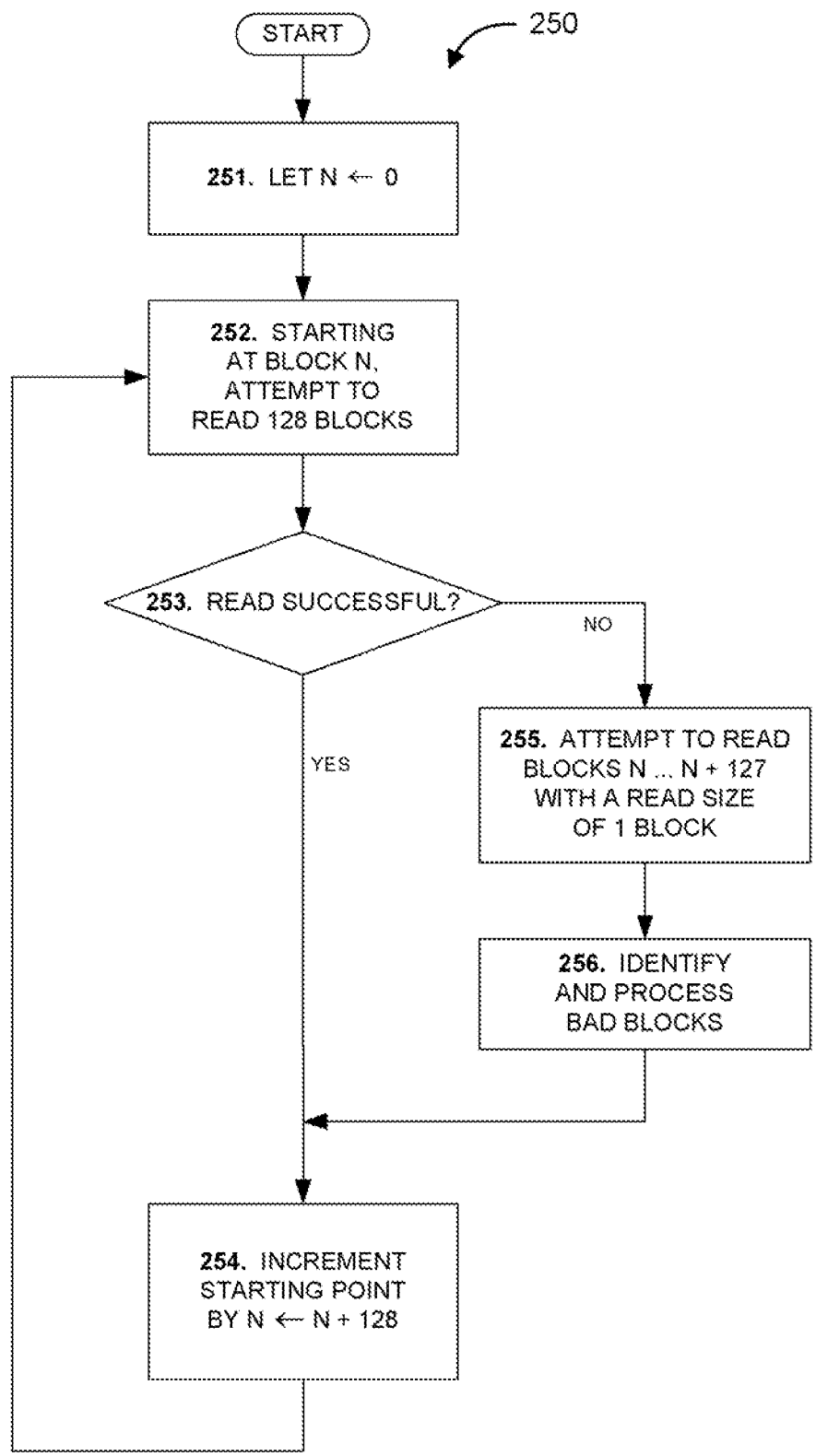
FIG. 5 shows a flowchart of a method for copying disk blocks as part of a disk imaging process.

It is much faster to read a disk by processing multiple blocks at a time. A block contains 512 bytes of data. Experimentation indicates that an optimal transfer size is 64K, or 128 blocks. The problem with a large block size is that a single bad block will cause the entire 64K read to fail. FIG. 5 shows a flowchart of a method 250 for reading for reading disk blocks that addresses this issue.

In step 251, a block starting point N is initialized by setting it equal to zero. In step 252, the system attempts to read 128 blocks, starting at block N. If it is determined in step 253 that the read is successful. i.e., if all 128 blocks are readable, then in step 254 the starting point is incremented by 128, and the system returns to step 252. If it is determined in step 253 that the read is not successful, then presumably at least one of the 128 blocks is a "bad" block. In step 255, the system attempts to read blocks N through N+127 with a read size of 1 block, rather than 128 blocks. In step 256, each identified "bad" block is processed, as described in further detail below. The system then proceeds to step 254.

Each block that cannot be read is noted in a per-image bad block table. This table is preferably stored in suitably compressed form, since a 40 GB disk, for example, has 80 million blocks.

If bad blocks appear in the middle of an image, it is important to fill those bad blocks with a specific value in the image file so that the correct blocks remain properly aligned. Although it is common practice in other situations to fill bad blocks with NULs in the image file, the Alix system of the invention generally does not follow this practice, because NUL-filled blocks can be forensically significant.

Instead, according to a further aspect of the invention, the Alix system fills the bad blocks with a 512-byte value that begins with "BAD BLOCK\000" and then contains 502 bytes of a randomly selected value that is unique to the specific disk image. Thus, bad blocks are readily identified within the image, but there is little chance of mistaking valid data for a bad block.

In addition, bad blocks do not need to be stored in a sparse image file, and their repeating character makes it likely that they will be compressed via a good block compression algorithm.

4.2 Image Data and Metadata Collection

According to a further aspect of the invention, the following information is recorded for each disk:

AUID: The audit user ID for which the image file was collected.

DriveIdent: How the drive's ATA or SCSI interface identifies the drive.

Image: The actual image file.

Hash: The hash of the image file.

HashAlg: The algorithm used to compute the hash.

ImageEquip: Equipment that was used to create the image. This is useful for tracing back systematic imaging errors that might have resulted from equipment malfunction.

ImageTime: The date and time that the image was acquired.

ImageTimeTZ: The time zone for ImageTime. Some databases do not store the time zone with the time.

ImageSeconds: The number of seconds required to image the disk. This can be useful for evaluating the drive's health, since drives that take uncharacteristically long to image frequently have bad or failing blocks.

ImageBlocks: The number of blocks in the image.

BadBlocks: The number of blocks that could not be read.

INotes: Notes associated with the imaging.

5. Image Importing

The number of image files and accession data files that can be collected on the Imaging Station is limited only by the size of the Imaging Station's self-contained storage. Once collected, these files are transferred to the Site Databank using the image synchronization protocol.

Figure 6:
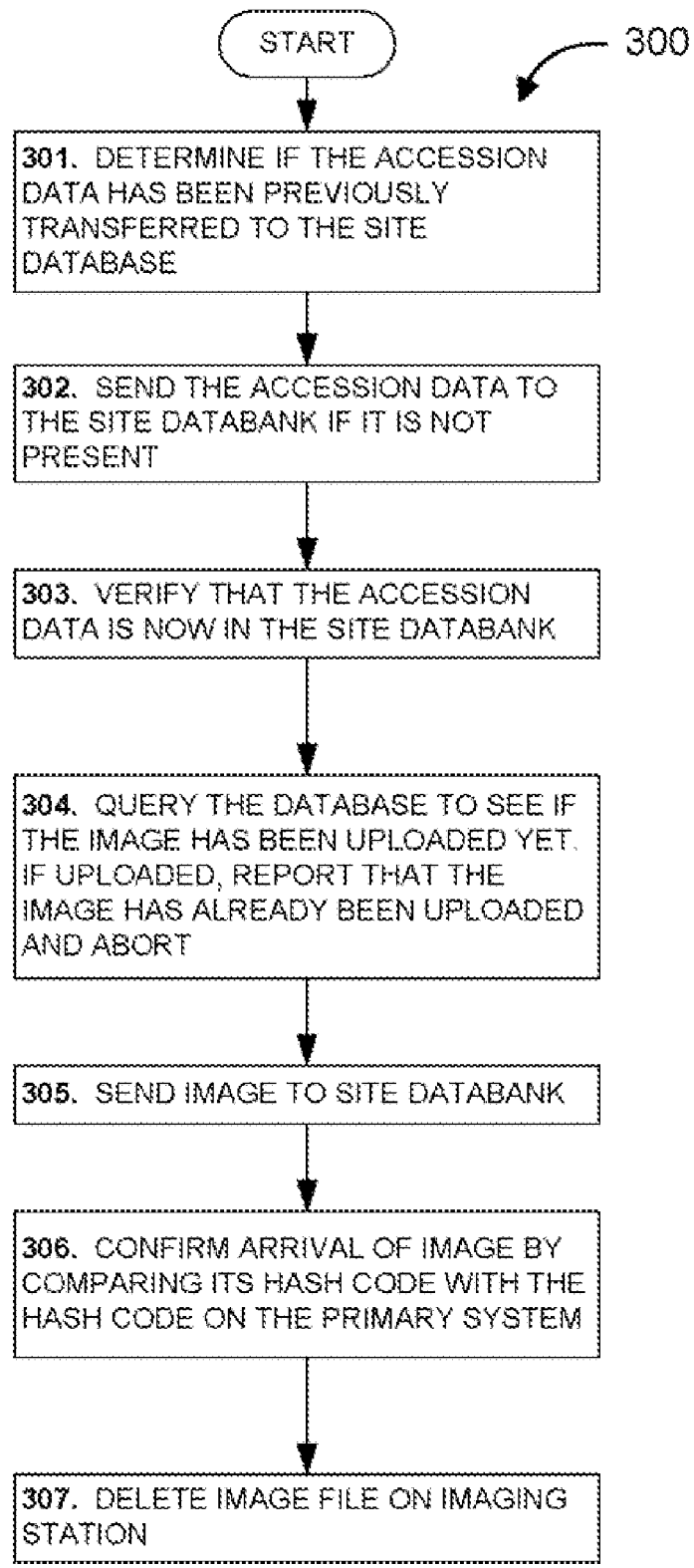
FIG. 6 shows a flowchart of an image synchronization protocol.

FIG. 6 shows a flowchart of an image synchronization protocol 300 according to this aspect of the invention. In step 301, it is determined whether the accession data has been previously transferred to the Site Databank. In step 302, the accession data is sent to the Site Databank if it is not present. The accession data includes the AUID and the metadata. In step 303, it is verified that the accession data is now in the Site Databank. In step 304, the database is queried to determine whether the image with (AUID, Hash) has been uploaded yet. If the image has been uploaded, report that the image has already been uploaded and abort. In step 305, the image metadata is sent to the Site Databank. This is typically done with XML RPC. In step 306, the image is sent to the Site Databank. In step 306, the arrival of the image is conformed by comparing its hash code with the hash code on the primary system. In step 307, the image file on the Imaging Station is deleted. The protocol 300 should also provide for security, so that unauthorized imaging stations cannot upload their own images.

Figure 7:
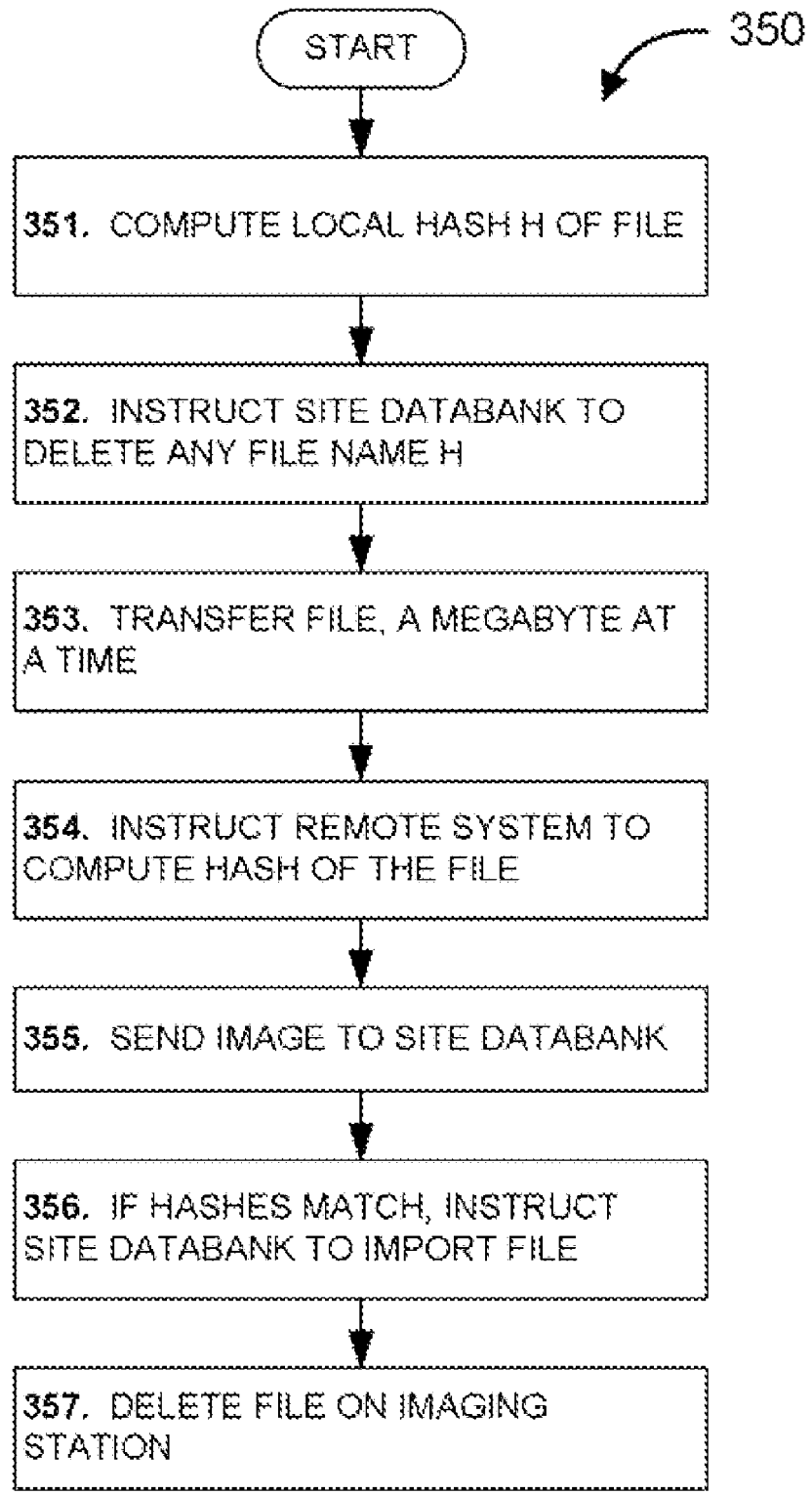
FIG. 7 shows a flowchart illustrating an image synchronization protocol, performed, in one embodiment, using the AFF file format.

FIG. 7 is a flowchart illustrating an image synchronization protocol 350 performed using an industry standard file format (which can be AFF or other). The following sequence of operations initiated at the Imaging Station. In step 351, the local hash H of the file is computed. In step 352, the Site Databank is instructed to delete any file name H. In step 353, the file is transferred, a megabyte at a time. In step 354, the remote system is instructed to compute the hash of the file. In step 355, the image is sent to the Site Databank. In step 356, if the hashes match, the Site Databank is instructed to import the file. In step 357, the file on the Imaging Station is deleted.

A further aspect of the Alix system provides a protocol based on XML RPC to transfer image files from the Imaging Station to the Site Databank. Although the system could use standard protocols like scp or tftp, that would require a second authentication system and create a second data path. Thus, there is some advantage to using a custom, reliable file transport protocol based on XML RPC. The following discussion defines the protocol.

write(HashID,offset,len,bytes): Writes an array of len bytes to offset offset in a file whose name is specified by HashID. This is implemented opening the file whose name is HashID in hex, doing an lseek to offset, and then writing len bytes. Returns "OK" if successful and "FAIL:error description" if failed.

hash(HashID,algorithm): Performs the cryptographic hash of the file specified by HashID using the algorithm algorithm and returns the value in hex. Returns "FAIL:error description" if failure.

delete(HashID): Deletes the file specified by HashID. Returns "OK" if successful and "FAIL:error description" on failure.

import(HashID): Imports the file specified by HashID. Returns "OK" if successful and "FAIL:error description" on failure. Automatically removes the file named HashID from the import directory on completion.

Figure 8:
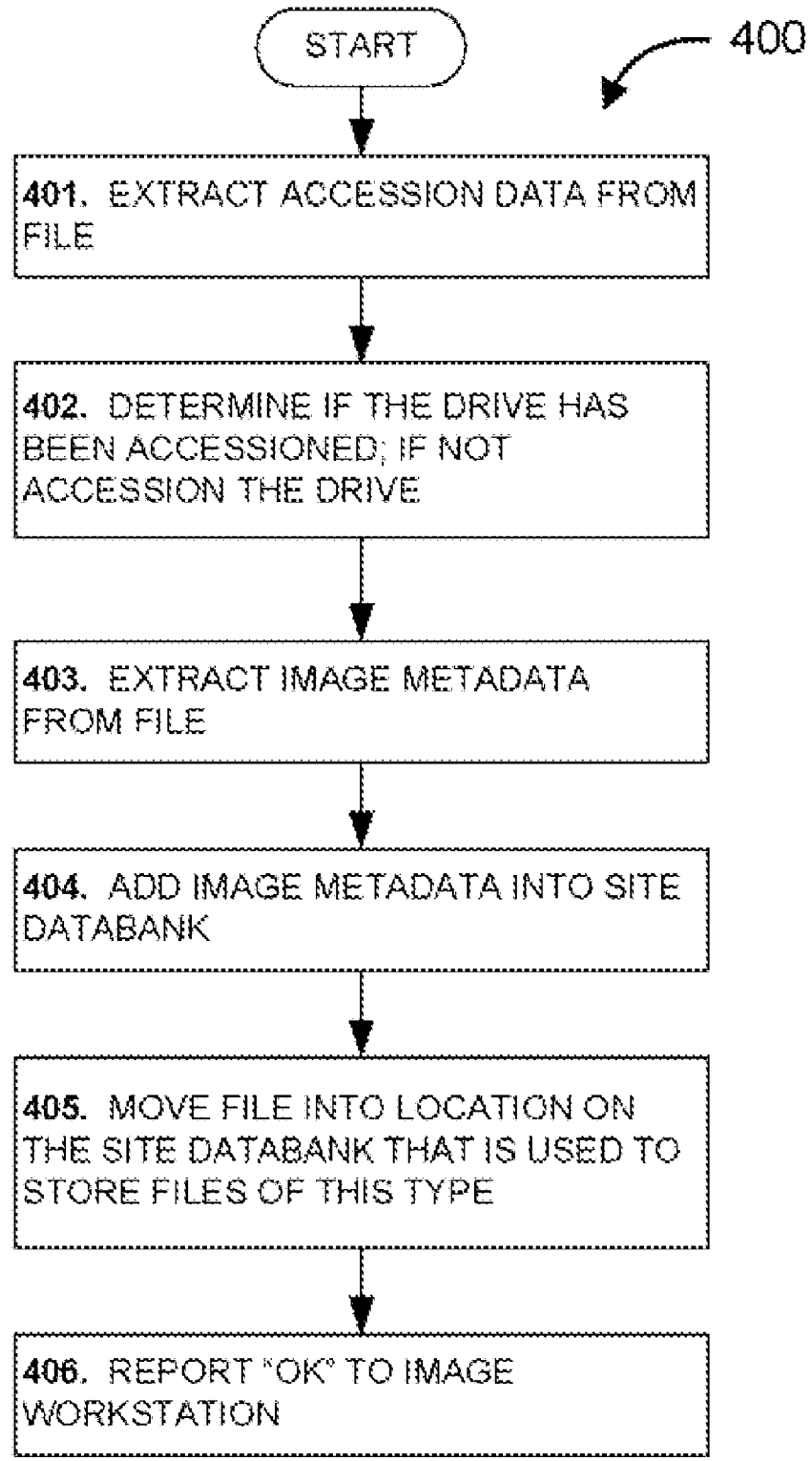
FIG. 8 shows a flowchart illustrating the operation of the import command used to import data images into the Site Databank.

The operation of the write, hash and delete RPC commands is evident from the present discussion. FIG. 8 shows a flowchart illustrating the operation of the import command 400. In step 401, the accession data is extracted from the image file. In step 402, it is determined whether the drive has already been accessioned. If not, the drive is accessioned. In step 403, the image metadata is extracted from the image file. In step 404, the image metadata is added into the Site Databank. In step 405, the image file is moved into the location on the Site Databank that is used to store image files of this type. In step 406, an "OK" is reported to the Image Workstation.

Once the image is imported, the disk has been accessioned and the metadata for the image is resident in the database. At that point, however, nothing else is known about the image, including how many blocks are zblocks. These values in the database are determined during the process of Feature Extraction.

6. Feature Extraction

Feature Extraction (FE) is the process of scanning imaged data for specific information that can be placed into the database. According to an aspect of the invention, FE occurs automatically after images have been imported in sequential fashion by a dedicated process. FE is a hatch operation; a single process guarantees that there will not be contention between multiple FE operations, which may result in a decrease in overall system performance.

In accordance with one embodiment of the invention, the FE process is automatically restarted if it crashes. A counter keeps track of the number of times FE has been attempted on an image. If the counter reaches a predetermined number (which could be 4, for example), then no more FE processes are attempted on the image, and instead, a message is written to a log file or database of pending alerts to be resolved by a human operator. In this circumstance, it is likely that the image is triggering a bug, and this requires analysis by an Alix programmer. A conventional trouble-ticket management system could be used for this purpose, or the implementer could simply create a database table for it.

6.1 Feature Table

Feature extraction can potentially generate tens of millions of data elements on the scan of a single hard drive. Although it is tempting to store features in the database, conventional databases fail when confronted with tables containing several hundred million records. To alleviate this problem, the Alix system of the present invention uses a "Feature Table" that is designed for performing cross-drive correlations. Each table consists of a single text file in the following format:

block count feature where block is the ASCII block number of where the feature was found, count is the number of this feature that were found, and feature is the feature itself. The features may be located at block or they may be located in subsequent blocks, in which case the actual block numbers are not recorded in the Feature Table. Feature Tables are designed for performing bulk feature correlation across many thousands of disk drives. These tables allow Alix to solve second-order forensic queries.

First-Order and Second-Order Forensic Queries: A first-order forensic query is a question that can be answered simply by running a filter process across all of the images in the collection, and tabulating the result. For example, using a Credit Card number detector, discussed below, a typical first-order question might be: "What is the disk drive that contains the most credit card numbers?" This is a highly useful query if the operator is interested in finding "hot drives." In this case, a "hot drive" is to be defined to be a drive containing a large quantity of financial information. The definition of a "hot drive" may be freely modified, depending upon the particular analysis that is being performed. "Hot drive" criteria may he updated, refined, discarded, or otherwise modified, as the need arises.

A second-order forensic query is one in which the results of a filter passing over a drive must be compared with the results of every filter passing over every other drive. An example of such a query might be: "Which are the two disk drives that have the highest number of credit card numbers in common?" This is a highly useful query if the analyst is attempting to map out a social network.

Efficient second-order queries: An efficient second-order query can be computed by creating a hash table or dictionary where the key is the name of the feature and the values are the DriveIDs of the disks on which that feature was found. The dictionary is created by scanning all of the feature files and updating the dictionary as each line of each feature file is read. Once the dictionary is created, its contents are sorted, using the length each value as the primary sort key. The dictionary entries with lengths that are over a predetermined threshold are said to be correlated by the cross-drive analysis (CDA) algorithm. The keys of this second dictionary are the features that are the cause of the correlation, and the values are the DriveIDs of the correlated drives.

6.2 Bulk Feature Extraction

Bulk Feature Extraction is the extraction of features from raw data blocks. Bulk Feature Extraction does not require an understanding of the file system and works across data blocks. One advantage of this approach is that it works with all file systems; one disadvantage is that it fails if critical information is split across two non-adjacent blocks of a fragmented file.

In one application of the Alix system, the following features are extracted: block hash, zblocks, credit card numbers, names and places, mail headers, and cookies. Each feature is discussed in turn.

Block Hash: Calculate a hash code for every block on the imaged disk. Each hash code is mapped to a HashID. Triplets of (DiskID, HashID, Count) are stored in a database table. Any file F can be decomposed into blocks $B_1 \ldots B_N$, with resulting MD5s $H_1 \ldots H_N$. Because many file systems block-align files, disk D contains file F if the database contains pairs $(H_1, D) \ldots (H_N, D)$. If it is not clear whether the last block of the file is zero-padded, then use only blocks $B_1 \ldots B_{N-1}$. Database tables used: blockhashes and hashids.

Zblocks: The number of zblocks (NUL-filled blocks) in the image. This number can be computed from the Block hash table, but it is such a useful number that it is concomitantly useful to maintain the column redundantly. In fact, the zblocks field can be used as a check on the Block Hash. FIG. 9 shows a code listing 420 illustrating an identity that can be used for this purpose. Database tables used: images.

Credit Card Numbers: Scans bulk data for credit card numbers and similar account numbers. The current credit card number detector scores the likelihood that a number is in fact a credit card number based on the following information: the number must pass the Luhn Algorithm (also known as the CCV); the number must have either no spaces or dashes, or have spaces and/or dashes in a form that is customary for credit card numbers; the number must have a prefix that is commonly used by credit card issuers; and adjacent credit card numbers must not show periodicity that is characteristics of certain image files. A point is scored for every set of numbers that passes all of the tests above. A point is removed for every number that passes the Luhn algorithm but fails the other tests above. If a score of a block is greater than zero, the credit card number is incorporated into the database. In this illustrative example, large numbers of credit card numbers are useful for identifying hot drives in a first-order analysis. The same credit card number being located on different drives is useful for identifying social networks in a second-order analysis. Database tables used: images, fe_CreditCardNumbers (see discussion below).

Names and Places: Scans bulk data for recognized names and place names. Database tables used: images, fe_NamesAndPlaces.

Mail Headers: Scans bulk data for recognized RFC822 mail headers. The entire mail header is stored in a database unparsed; a second agent parses the mail headers. Database tables used: images, fe_MailHeaders.

Cookies: Scans bulk data for browser cookies in a variety of file formats, including Internet Explorer, Netscape, and Opera. Database tables used: images, fe_Cookies.

6.3 Forensic Feature Extraction and Cross-Drive Analysis (CDA)

Aspects of the invention discussed above are now discussed in greater detail with respect to forensic feature extraction and cross-drive analysis (CDA). The cross-drive analysis methods and systems described herein overcome the problems of the prior art, in part by using feature extractors applied to bulk data and statistical techniques applied to a multi-drive corpus.

The CDA technique was developed in conjunction with a forensic project, in which a large number of drives were purchased on the secondary market and examined for traces of confidential information. The number of drives quickly exceeded the analytical capacity of the prior-art tools used for the project. Accordingly, there were developed a series of tools to look for credit card numbers, email addresses, and other kinds of confidential information. It will be appreciated from the present discussion that these tools may be modified to look for other types of information without departing from the scope of the invention.

Several uses have been identified for CDA, including the following:

1. Automatic identification of "hot" drives. Using statistical techniques, it is possible to automatically identify drives in a large collection that are likely to be of interest, and thus should be given higher priority.

2. Improving single drive forensic systems. Data collected during the course of CDA can be used to create smarter single-drive forensic tools. For example, CDA can be used to develop a "stop list" of information that can be safely ignored by other forensic tools.

3. Identification of social network membership. If several drives in a forensic repository are known to have been used by an organization under scrutiny, for example, a terrorist organization, then CDA can be used to determine if a newly acquired piece of digital media was used by another organization that had contact with the organization in question.

4. Unsupervised social network discovery. Given a collection of forensic images, CDA can be used to automatically identify organizations that were not previously known.

Today's forensic investigators working on behalf of law enforcement rarely archive images from multiple investigations on a single file server. It has been argued that it is important to work on one drive at a time to avoid the inadvertent mixing of information between cases. However, such assertions arguably may be unduly limiting. A law enforcement forensic lab presumably can both implement CDA and still meet the custodial standards imposed by the Federal Rules of Evidence, or other applicable law. CDA is potentially far less invasive than other kinds of investigations, in that a human investigator is only exposed to information likely to yield important results.

6.4 Forensic Feature Extraction

CDA is based on the identification and extraction of pseudo-unique identifiers (discussed in greater detail below), such as credit card numbers and email Message-IDs, from digital media. Once extracted, these identifiers are called "features" and are used as the basis for both single-drive analysis and multi-drive correlation. This section discusses the principle and mathematical justification for feature extraction, and presents examples of feature extractors that have been created and that could be created in future.

Pseudo-unique Identifiers: A pseudo-unique identifier is an identifier that has sufficient entropy such that within a given corpus it is highly unlikely that the identifier will be repeated by chance. Repetitions of pseudo-unique identifiers happen, but when they happen it is the result of a specific process, such as a file being copied from one computer to another. An email Message-ID is a typical pseudo-unique identifier. Consider Message-ID 20060410204756.23E38908DE@spooky.sd.dreamhost.com, which was created by the computer spooky.sd.dreamhost.com for an email message that was sent on Apr. 10, 2006.

The use of a time stamp, a random number and a hostname makes it very unlikely that two computers will chose the same Message-ID by accident. This is in compliance with standard RFC 822, which requires the uniqueness of the message identifier to be guaranteed by the host which generates it.

But Message-IDs are not unique; they are pseudo-unique. Most Message-IDs are created for a single email message and if the same Message-ID is found on two computers, there is a good chance that an email message, or at least the Message-ID, was copied from one machine to the second. After an email message is sent from one computer to another, both computers potentially have copies of the Message-IDs on their hard drives. Those copies can be in actual files, in email message archives, in temporary files that have been deleted, or in virtual memory backing store. Multiple recipients may cause messages with the same Message-ID to travel very different paths and have different headers—even different Subject lines, if one of the recipients is a mailing list that modifies the Subject line.

Thus, the existence of the same Message-ID on two different computers strongly suggests that there was some process which transferred the identifier from the first computer to the second. There might be alternative possible explanations for finding the same Message-ID on two different computers. For example, it is always possible that the same computer could create the same Message-ID for two different messages, although this would represent a failure of the computer's software or programming. Alternatively, two different computers could create two messages with the same Message-ID as the result of an accidental misconfiguration or an intentional spoofing attempt.

It has been found that good pseudo-unique identifiers have a number of properties, including the following:

1. They are long enough so that collisions are unlikely to occur by chance.
2. They can be recognized using a regular expression and do not require parsing or semantic analysis.
3. They do not change over a time.
4. They can be correlated with a specific documents, people or organizations.

Not all specific identifiers in a particular class of identifiers need to be pseudo-unique. For example, the Message-ID 4231.629.XYzi-What@Other-Host is not pseudo-unique because it appears in the text of RFC822. As a result, any forensic tool that uses pseudo-unique identifiers needs to have a mechanism for distinguishing between identifiers that are truly pseudo-unique and those that are ubiquitous.

Feature Extractors: A further aspect of the present invention provides a variety of programs called feature extractors that can scan a disk image for pseudo-unique features and store the results in an intermediate file. Some of these feature extractors include the following:

An email address extractor, which can recognize RFC822-style email addresses.

An email Message-ID extractor.

An email Subject: extractor.

A Date extractor, which can extract date and time stamps in a variety of formats.

A cookie extractor, which can identify cookies from the Set-Cookie: header in web page cache files.

A US social security number extractor, which identifies the patterns ###-##-#### and ######### when preceded with the letters SSN and an optional colon.

A credit card number extractor.

However, many specific features generated by these feature extractors do not meet the above-described requirements for pseudo-uniqueness.

For example, while some "Subject:" lines are certainly pseudo-unique, others are ubiquitous. Likewise, there are specific email addresses that are in Microsoft Windows DLLs and in X.509 certificates. We have developed a mathematical technique that can be used to differentiate, for example, between "Subject:" lines that are common and those that are distinctive. This technique is described below.

6.5 Single Drive Analysis

Extracted features can be used to speed initial analysis and answer specific questions about a drive image. The applicant has successfully used extracted features for drive image attribution and to build a tool that scans disks to report the likely existence of information that should have been destroyed. Such information can include, for example, information governed by the provisions of the Federal Fair and Accurate Credit Transactions Act, or other laws.

Drive Attribution: There are many circumstances in which an analyst might encounter a hard drive and wish to determine to whom that drive previously belonged. For example, the drive might have been purchased online, and the analyst might be attempting to return it to its previous owner. Alternatively, the image might be one of several thousand obtained by spyware or another agent running on a target machine and the analyst might wish to determine if the subject belongs to a person or organization of interest. In either case, the analyst would like to have a tool so that a rapid ownership determination can be made without the need to painstakingly look for documents on the disk and then attempt to determine their pedigree and author.

A powerful technique has been developed for making this determination, according to which there is created a histogram of the email addresses on the drive, as returned by the email address feature extractor. In many cases the most common email address on the disk image is the address of the primary user of the computer from which the drive was extracted, provided that the primary user made use of email.

The most common email address on the drive is usually the email address of the drive's primary user because that person's email address appears in both the from: and in the to: or cc: fields of many email messages that remain on the computer's disk drive. In general, there are roughly twice as many email addresses belonging to the primary user as any other user. The applicant's experience indicates that this is true both for users of email clients such as Outlook Express as well as for users of webmail systems such as Hotmail.

FIG. 10 shows a histogram 440 of the top 15 email addresses found on Drive #51 in a sample corpus of hard drives to be analyzed, listing the frequency of each email address. Names in ALL CAPS have been used to anonymize names or domains that contain personally-identifiable information. The first name on the list, ALICE@DOMAIN1.com, appears more than twice as much as any other name and likely represents the primary user of the machine.

Additional information can be readily inferred from the histogram 440. For example, the large number of email messages from JobInfo@alumnigsb.stanford.edu strongly implies that ALICE was a graduate of Stanford University's Graduate School of Business. In many cases the email addresses that we found on the sample disk drives yield a single individual when they are typed into an Internet search engine such as Google. It is also noted that the drive numbers presented in the sample corpus are based on accessioned drives, not captured images. The sample corpus of 750 drive images comes from a larger collection of 1005 disk drives.

The email histogram technique works surprisingly well even when the drive in question has not been used extensively for email. For example, FIG. 11 shows a histogram 460 of the top 15 email addresses, with the frequency of each email address, that were found on Drive #80, a disk that contained 1247 credit card numbers. The second column indicates the number of times that the email address was found on Drive #80, while the third column is the number of drives in the 750-image corpus on which each email address was seen.

Although the most common email addresses are from digital certificates issued by Thawte and VeriSign, if these are suppressed using techniques that will be discussed in the next section, it is possible to identify a specific email address ANGIE@ALPHA.com, which appears to have been the email address of the primary computer user. Manual analysis of the drive revealed that the companies ALPHA.com, BETA.com, GAMMA.com, DELTA.com, UNIFORM.com and SNARF.com all make the same kind of software—and that XYZZY.COM is a personal website for an individual who uses this software and displays it on his website. It appears that Drive #80 was used to process credit cards for software that was sold by this company. This is an intelligence datum which could have been discovered through a lengthy manual examination of the drive, but which was made readily apparent through the email histogram.

6.6 First-Order CDA

As discussed above, cross-drive analysis (CDA) is a technique for conducting a forensic analysis of a data set that spans multiple drives. The fundamental theory of CDA is that data gleaned from multiple drives can improve the forensic analysis of a drive in question both in the case when the multiple drives are related to the drive in question and in the case when they are not. The architecture for CDA uses extracted features, described above, both to make CDA more efficient, and to focus the analysis on features that are relevant to today's forensic examinations. Two forms of CDA are described herein: first-order CDA, in which the results of a feature extractor are compared across multiple drives, an $O(n)$ operation; and second-order CDA, where the results are correlated, an $O(n^2)$ operation.

CDA Stop Lists: A simple and straightforward application of CDA is to create stop lists of features that can be safely ignored in most forensic investigations because the features are ubiquitous. For example, the first six email addresses in the FIG. 11 histogram 460 are widespread on disk images today because they are present in X.509 root certificates that are distributed with many popular web browsers. Because these addresses are so widespread, they can be automatically suppressed from any list of email addresses that are displayed by forensic tools or used in further analysis. FIG. 12 shows a histogram 480 listing the 15 email addresses that are on the largest number of drives in the 750-image sample corpus. These email addresses, and many others, can be automatically suppressed by forensic tools because they are part of the operating system and, therefore, not likely to be related to a case under investigation. For example, the email address mazrob@panix.com is present in the Windows system file clickerx.wav and appears to be the email address of the authors of the "Close Program" sound for the Windows 95 Utopia Sound Scheme.

To be sure, there may be times that even ubiquitous information may be useful for an analytic process. For example, if a subject being sought is known to have used a specific version of Mozilla Firefox, then it would not make sense to suppress email addresses from certificates that were part of the Firefox distribution. To the contrary, such features could be used as a positive selection criteria in an attempt to narrow down drives that might have belong to the subject. Such a search represents a very specific application which can easily be handled by simply turning off the stop list. This application shows why the stop list should be used to suppress output, rather than for suppressing collection.

Hot Drive Identification: If the features extracted from the disk images are generically of interest to the investigator, then the investigator's work can be easily prioritized by concentrating on the drives that have the largest number of these features. The term "hot drive identification" is used herein to describe this kind of prioritization. For example, the Fair and Accurate Credit Transactions Act of 2003 (FACT-ACT) requires United States corporations disposing of electronic media to purge the media of "consumer information." The United States Federal Trade Commission's Final Rule implementing the rule defines consumer information as "including, but not limited to, a social security number, driver's license number, phone number, physical address, and e-mail address."

Based on the above-described feature extractors that can recognize social security numbers, e-mail addresses and other "consumer information," we can automatically identify violations of the FACT-ACT. Work can be automatically prioritized by querying the database for the drives with the largest number of features that correspond to "consumer information."

The social security number extractor was able to find identified social security numbers in 48 of the 750 disk images. Of these, 9 disk images contained SSNs that appeared to he test data (e.g. 555-55-5555 and 666-66-6666). Eliminating these test SSNs left 39 disks that had SSNs representing potential privacy violations. One of these, Drive #959, had 260 unique SSNs and appeared to contain consumer credit applications.

FIG. 13 shows a table 500 listing the disk images containing the largest number of extracted SSNs after obvious test data has been suppressed. The table heading "Unique SSNs" refers to the number of individual SSNs that were found, while the table heading "Total SSNs" refers to the total number of SSNs that were present, including duplicates. An organization charged with policing for violations of the FACT-ACT could use this list to prioritize its work.

As a second example of this "hot drive" technique, there were computed histograms of the extracted email addresses for the entire sample corpus of 750 images. There were found 13 drives (339, 340, 342, 343, 345, 356, 348-351, 354, 356 and 357), each approximately 1 gigabyte in size, that all had between 710,000 and 765,000 unique email addresses and between 2.4 million and 2.7 million email addresses in total. These drives, referred to as "Lot SP," were obtained as the result of a single purchase brokered through an online source. Overall, the 750 drive images in the sample corpus represented approximately 75 lots.

The drives in Lot SP appear to have come from an organization that was involved in sending bulk email. For example, many of the email addresses on these drives appear in alphabetical order, sorted by domain name to allow for efficient use of SMTP connections, many clearly do not belong to individuals (e.g. test.agentl@somedomain followed by test.again@somedomain) and many appear to have been scraped from web pages.

Not only does the sale of these drives from such an online source possibly represent a violation of the FACT-ACT, data on the drives may also indicate that additional laws restricting the sending of bulk email have been violated. Although the goal of the investigation was not to find individuals or organizations engaged in such practices, these hot drives were readily apparent.

6.7 Second-Order CDA

The preceding section explored a variety of first-order cross drive analysis techniques. This section explores second-order techniques that are based on cross-correlations of the data on multiple drives. Put another way, in the preceding section, techniques were explored for automatically selecting drives that had the largest number of email addresses and other features. In this section we explore a different question: which are the drives in the corpus that have the largest number of features in common? This question can be answered using multi-drive correlation of discrete features.

To this end, a further aspect of the invention provides a Multi-Drive Correlator (MDC), a program that reads multiple feature files and produces a report containing, for each feature, a list containing the number of drives on which that feature was seen, the total number of times that feature was seen on all drives, and a list of the drives on which that feature occurs. Mathematically, the MDC is a function whose input is a set of drive images in a feature to be correlated, and whose output is a list of (feature, drive-list) tuples.

Email Address Multi-Drive Correlation: Applying the MDC to the email feature files, it was learned that the corpus contained 6,653,396 unique email addresses. Because so many email addresses were found on the 13 drives of "Lot SP," these drives were suppressed and a second MDC was calculated. Without Lot SP, there were only 331,186 unique email addresses in the corpus. FIG. 14 shows a histogram analysis 520 of both correlations. Specifically, the FIG. 14 histogram 520 shows the total number of email addresses found on a single drive, on a pair of drives, and so on. The middle column shows the number of email addresses found on all drives in the corpus, while the right column shows the number of email addresses found on all of the drives in the corpus with the exception of those drives that were in "Lot SP"

The first line of the FIG. 14 table 520 shows how many unique email addresses were found on a single drive, the second line shows how many unique email addresses were found on just two drives, and so on. This table implies that the number of email addresses in common between drive images seems to follow a power-law distribution. Such distributions have been found to be common when performing MDC analyses.

Scoring the Correlation: Once the correlation list is produced, it is desirable to produce a report of the drives that are most highly correlated. The applicant has experimented with three weighting functions for scoring the correlation between each pair of drives.

Let:

$$D = \text{\# of drives}$$

$$F = \text{\# of extracted features}$$

$$d_0 \ldots d_D = \text{Drives in corpus}$$

$$f_0 \ldots f_F = \text{Extracted features}$$

$$FP(f_n, d_n) = \begin{cases} 0 & f_n \text{ not present on } d_n \\ 1 & f_n \text{ present on } d_n \end{cases}$$

A simple scoring function is to add up the number of features that two drives have in common:

$$S_1(d_1, d_2) = \sum_{n=0}^{F} FP(f_n, d_1) \times FP(f_n, d_2)$$

A more sophisticated weighting function discounts features by the number of drives on which they appear, which makes correlations resulting from pseudo-unique features more important than correlations based on ubiquitous features:

$$DC(f) = \sum_{n=0}^{D} FP(f, d_n) = \text{\# of drives with feature } f$$

$$S_2(d_1, d_2) = \sum_{n=0}^{F} \frac{FP(f_n, d_1) \times FP(f_n, d_2)}{DC(f_n)}$$

Features that are present in high concentrations on drives $d_1$ and/or $d_2$ may have increased weight. For example, increasing the weight of these features increases the score between a computer user who had exchanged a large volume of email with a known terrorist, or other person of interest, when compared with an individual who has only exchanged one or two emails with the terrorist:

$$FC(f, d) = \text{count of feature } f \text{ on drive } d$$

$$S_3(d_1, d_2) = \sum_{n=0}^{F} \frac{FC(f_n, d_1) \times FC(f_n, d_2)}{DC(f_n)}$$

The three described weighting functions are undergoing continued study and evaluation. Initial findings are discussed below.

A Scored SSN Correlation: An MDC was performed using extracted social security numbers. After removing spaces and dashes from the recognized SSNs, it was found that only 5 SSNs were present on more than one drive. FIG. 15 shows a table 540 setting forth the results of the multi-drive correlation of SSNs. Unlike the FIG. 13 table 500, test data has not been suppressed. The numbers $SSN_1$ and $SSN_2$ have been anonymized because they represent actual SSNs belonging to individuals.

Although a total of 571 SSNs were found in the 750-drive corpus, only 5 SSNs were found on more than one drive. Of these, 3 were test SSNs and 2 appear to be valid SSNs which we shall call $SSN_1$ and $SSN_2$ for the purpose of this document:

$SSN_1$ was found on three drives: Drive #342, #343 and #356. In each case the SSNs appeared in unstructured text. Before the SSN was a date of birth of Apr. 27, 19XX. After the SSN was the notation "Thanks, Laurie." All of these drives were purchased as part of Lot 34 and all appear to have come from the same organization.

$SSN_2$ was found on two drives: Drive #350 and #355. In both images the SSN is preceded with the string "great grandchildren" and followed by the string "I used to." Because the SSN appears at different locations in the two disk images, it is believed that the information was copied from one drive to the second in the course of normal computer operations. Both drives are SCSI Seagate ST19171W drives with a SUN9.0G firmware and of exactly the same size.

FIG. 16 shows a table 540 setting forth the results of the three scoring functions presented above, applied to some of the drive pairs in FIG. 15, sorted by $S_3$ scores. As shown in FIG. 16, function $S_3$ gave drive pair (612, 690) the highest weight. This makes sense, since these two drives together had 8 copies of the SSN "555555555." The fact that this is a test social security number and not a real one is ironic but ultimately irrelevant. $S_3$'s real limitation is that it does not correlate the three drives with $SSN_1$ as strongly as the 9 drives with the SSN "666666666."

Interestingly, due to a clerical error at the time of imaging, the data for drive #355 was originally labeled as coming from drive #357, which is from a different lot. After the correlation match was noted, the metadata associated with the drives and the actual drives was examined to verify the cross-lot correlation, and the error was discovered. It was possible to determine the ground truth of drive #355 because the drive was physically labeled with both its lot number and drive number, and because our disk imaging program records both the bytes read from the drive and the drive's serial number in a single file.

This example shows both the importance of recording data with metadata, and the power of the cross-drive correlation technique for identifying drives from the same organization. It also shows how CDA can be used for social network analysis. In this case, the social networks that were discovered were the social network that contained drives (342, 343, 356) and the social network that contained drives (350, 357).

A Credit Card Number MDC: A total of 5,796,217 strings of 14-, 15- and 16-digit numbers in the 750-drive corpus passed the first credit card number (CCN) test, while only 159,419 passed all four tests:

1. The string is a sequence of 14-16 digits with either no spaces or broken up by spaces or dashes in the manner that credit card numbers are typically displayed.
2. No single digit is repeated more than 7 times, and no parts of digits are repeated more than 5 times.
3. The first 4 digits belongs to financial institution that is known to issue credit cards, and the length of the string without spaces is consistent with the particular financial organization.
4. The sequence of digits follows the credit card number validation algorithm.

The multi-drive correlator was applied to both collections and then the drive-pair weights for each correlation result was computed. Previously, three pairs of drives in first set of 250 disk images were identified as being highly correlated. One pair (171,172) was correlated because of actual credit card numbers, while two other pairs, (74,77) and (179, 206), had been correlated the basis of string sequences that passed the CCN-identifier test, but which actually were not. Each of these pairs was apparently correlated because both halves of the pair contained the same fragments of a file that had the false-positives.

Because of the large number of drives with CCNs in the data set, the remainder of this section looks at just a few pairs that were considered. FIG. 17 shows a table 580 noting the maximum score for all drive pairs using both corpora as well as the score of several notable drive pairs, discussed below. Specifically, FIG. 17 shows the results of the scored multi-drive correlation applied to the corpus of CCNs that passed the first test, and those that pass all of the tests.

Drives #74 and #77: These two drives were part of a lot purchased from a single reseller in the Pacific Northwest. Manual inspection of the information on the drives had previously revealed that four of them had come from the same community college. The cross-correlation found 25 unique 15 and 16 digit numeric strings that were recognized as CCNs by the CCN feature extractor that were common to these drives and only to these drives, but visual inspection revealed that they were not actually CCNs, but instead false-positives of the CCN detector.

Drives #171 and #172: The first-order analysis of our corpus identified drive #172 as being of interest because of the large number of CCNs that it contained—31,348 CCNs, of which 11,609 (37%) were unique. This drive was later manually identified as being an Oracle database drive that had been used to hold patient billing records by a medical center in Florida. The cross-drive analysis revealed that this drive had 13 unique CCNs in common with Drive #171. Unlike the previous example, these identifiers appear to be actual CCNs. Subsequent analysis of Drive #171 revealed that this drive contained 346 CCNs, of which 81 (23%) were unique. Also found on Drive #171 was C source code. It appears likely that this drive was used by the medical center's programmers for their development system, and that the programmers tested their system with actual patient data.

Drives #339 through #356: These drives were all purchased from a dealer in New York, N.Y. Manual inspection reveals that many of these drives were used by a travel agency; many contained names, credit card numbers, ticket numbers, itineraries, and email messages to clients. A cluster analysis, which will be described in a future paper, shows that all of these drives are highly correlated using many different weights. A representative drive pair is reported in FIG. 17.

Drives #716 and #718: These two drives were both part of Lot 70, a collection of 4 drives from a dealer in Union City, Calif. We have not done further analysis to understand why these drives are correlated.

Drives #814 and #820: These two drives were part of Lot 78, a collection of 15 drives purchased from a dealer in Stamford, Conn. As with the previous drives, it has not yet been determined why these drives are correlated.

6.8 Implementation Examples

The applicant has designed an end-to-end architecture for cross-drive analysis that accessions and images data from disk drives and other digital storage media obtained on the secondary market, stores intermediate results in feature files and a database, builds intermediate cross-correlation tables, and supports an interactive multi-user interface for database exploration.

Figure 18:
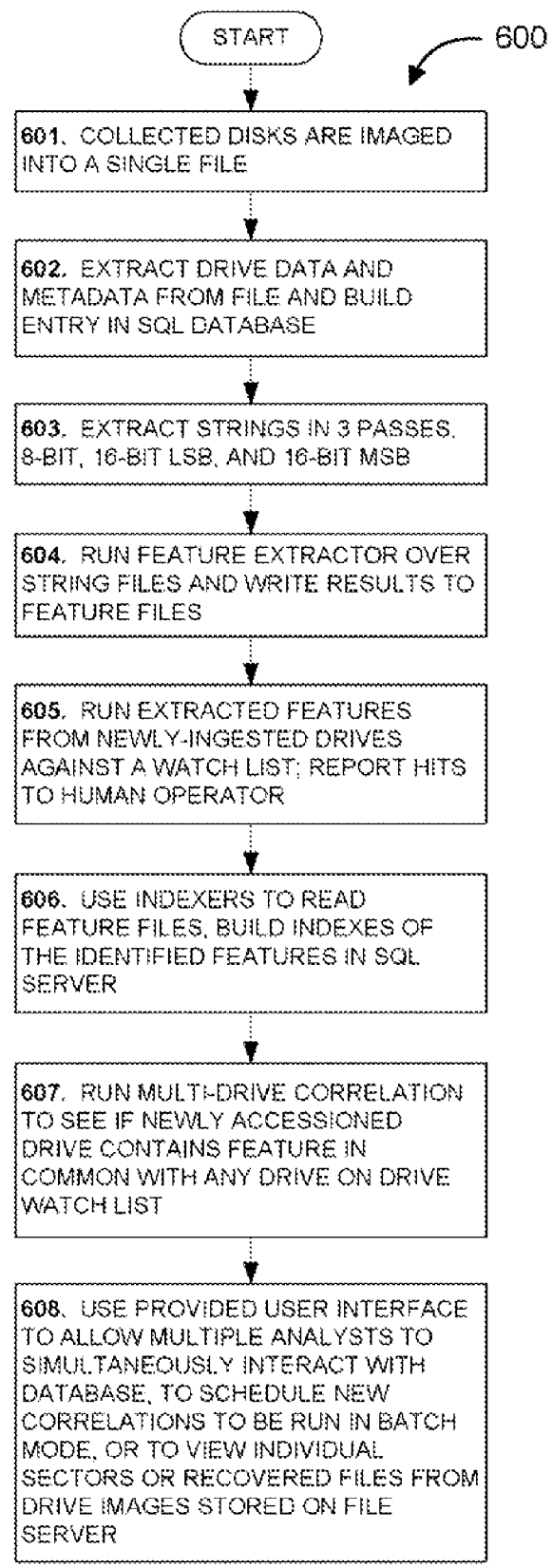
FIG. 18 shows a flowchart illustrating data flows through the Alix system as it conducts a cross-drive analysis.

FIG. 18 is a flowchart 600, illustrating data flows through the system. In step 601, disks collected on the secondary market are imaged onto into a single Advanced Forensic Format (AFF) file. AFF is a file format for disk images that contains all of the data accession information, such as the drive's manufacturer and serial number, as well as the disk contents. AFF also has the ability to distinguish sectors that cannot be read from sectors that are properly cleared. As an added benefit, AFF stores the disk image as a series of compressed segments, dramatically minimizing the amount of server space consumed by the image while still allowing the data within the image to be randomly accessed. In step 602, the afxml program is used to extract drive metadata from the AFF file and build an entry in the SQL database. In step 603, strings are extracted with an AFF-aware program in three passes, one for 8-bit characters, one for 16-bit characters in least significant bit (LSB) format, and one for 16-bit characters in most significant bit (MSB) format. In step 604, feature extractors run over the string files and write their results to feature files. In step 605, extracted features from newly-ingested drives are run against a watch list; hits are reported to the human operator. In step 606, the feature files are read by indexers, which build indexes in the SQL server of the identified features. In step 607, a multi-drive correlation is run to see if the newly accessioned drive contained features in common with any drives that are on a drive watch list. In step 608, a user interface allows multiple analysts to simultaneously interact with the database, to schedule new correlations to be run in a batch mode, or to view individual sectors or recovered files from the drive images that are stored on the file server.

Extractor Implementation: The described feature extractors may be implemented using regular expressions compiled with Flex. Additional rules are implemented in C++. Although it is possible to run the scanners directly on raw ("dd") disk images, it has been found that an improved technique is to first preprocess the disk images with the "strings" program that is part of the Free Software Foundation's binutils distribution. Three passes are made with strings, extracting 8-bit-byte, 16-bit bigendian, and 16-bit littleendian codings. The scanners are then run on the resulting files. In this manner, the amount of data that the feature extractors need to examine is reduced, while the amount of features that can be extracted is actually increased, since an extractor written to recognize 8-bit features can now find 8-bit features that are coded in 16-bit character sets. The result, of each extractor are saved in a feature file.

Each line of the file consists of the feature that was detected, the context in the file before and after the feature, and the offset of the feature in the disk image. Both the context and the position information can be used by other tools—for example, by an interactive tool that allows an analyst to view the region in the file system where the feature was detected. FIG. 19 shows an example of a feature file 620 according to this aspect of the invention.

Correlator Implementation: The initial MDC was written in the Python programming language. Although Python is a useful language for prototyping, it can be relatively slow and memory-intensive for this work. Performing the MDC of the email addresses resulted in a Python process that slowly expanded to consume more than 3.5 GB of memory and did not complete its task after 24 hours of computation due to excessive paging. Rewriting the MDC in a mixture of C and C++ resulted in a fast correlator that consumed less than 600 MB of memory; correlations of the 750-drive corpus typically take between 10 minutes and 2 hours on a 1.8 GHz AMD64. The MDC uses a hash table based on Goldfoot's "Simple Hash" implementation.

In exchange for speed, this implementation does not include features such as data generalization or automatic re-hashing. Hash tables must be declared to be a particular size when they are first created.

6.9 Further Implementations

It will be appreciated from the present description that CDA provides a useful technique for improving the automation of forensic tools and for intelligence analysis. It will further be appreciated that refinements and modifications may be made to the described systems and techniques without departing from the scope of the invention.

Such refinements and modifications may include the following:

First, increasing understanding of the multi-drive correlation, and in particular techniques that can be used to more accurately score the relationship between drive pairs and to cluster drives.

Second, improving facility at working with the large datasets required to do cross drive analysis. There are likely many opportunities to improve performance, including the use of machines with larger main memories; developing algorithms designed to run on clusters; and the use of more efficient algorithms.

Third, the use of expanded feature extractors. For example, the cookie extractor may be extended to extract cookies from cookie jars. Additional specificity may he achieved by preprocessing the disk images using a forensic tool such as The Sleuth Kit to extract all data files from the disk image and then using format-specific feature extractors. Also, language-aware systems such as the Rosette Linguistics Platform, available from Basis Technology Corp., of Cambridge, Mass., may be utilized. In addition, the techniques described herein may be embodied in a system that performs correlations based on cryptographic hashes of individual sectors in the disk images.

An interesting property of most modern file systems is that files larger than 4K are invariably stored with their first bytes block aligned. Thus, any search for the MD5s of the file's "sectors" will appear on the hard drive, even if the file system format is not understood. It should be possible to use as features the hashes of all of the sectors of a disk drive.

Finally, tools can be further developed that render this technique even more useful to forensic workers and intelligence analysts. While automated tools might be preferred, it is likely simpler to initially create interactive tools that leverage pre-computed feature indexes.

7. Additional Implementation Examples: The Analyst Workstation/Analysis Engine

According to one aspect of the invention, the Analyst Workstation is implemented as a three-tier Web-based application, which is shown within the block diagram of FIG. 3, discussed above. As shown therein, the first tier consists of the Web browser and associated Java or JavaScript that runs on a standard PC, like those used for the Analyst Workstations 1008. The second tier is the front-end Web server and business logic that runs on the Analysis Engine 1004. The third tier is the MySQL database, such as may be provided by the Site Databank 1006. Many variations of this are of course possible and within the spirit and scope of the invention.

7.1 The Analyst Workstation

In one embodiment, the Workstation provides the following functions:

Display and search of the drive database: This involves Web-based search and retrieval.

Scheduling a time-consuming job: For example, search all of the drives for a particular search string; show all the drives that went to a particular website; or find all of the drives that result from a particular social-network search.

Review the results of a scheduled job.

Export a drive image in ISO/IMG format to the Analyst Workstation: Options for export include downloading the image over HTTP and running Samba with a read-only mount point. Samba is an open source suite of applications (for example, Unix applications), available from http://samba.org, and capable of using Server Message Block (SMB) protocol. SMB is used by many operating systems, including Windows, to perform client/server networking. Accordingly, by supporting this protocol, Samba allows Unix servers to communicate using the same networking protocol as Microsoft Windows. Thus, for example, a Samba-enabled Unix machine can emulate a server on an otherwise Windows- (or other-) based network and offer sharing of file systems, and other functions. For example, images could be transferred by Samba, HTTP or the like from a Unix server to a workstation running Windows, Linux or other operating system. Using Samba in accordance with its known uses, and following the techniques described herein in connection with the present invention, the implementer can design a system that would allow for the disk images to be present in a remote file system that is served by a Samba client.

7.2 Analysis Engine

According to an aspect of the invention, the analysis engine comprises a number of components, each using known operating system, server, database, or programming language constructs, including the following: FreeBSD (operating system); Apache 2 (Web server functionality); MySQL, PostgreSQL, or Teradata (database functionality); and C, C++, or Python (application programming language).

Configuration Information: All configuration information should be kept in the database, and configuration files should be parsed and a backup system provided, particularly since in the typical case, backup functionality should already be provided to backup the database.

Database: The implementer can select a database based on performance and other criteria. While the development work was done using MySQL, other databases, such as Teradata, may also be used.

Development Language(s): The implementer can choose a development language based on performance and other criteria, and it will typically be a high-level, type-safe language such as Python. Where performance is an issue, methods coded in such languages can be easily re-coded into higher-performance languages such as C or C++.

7.3 Work Queues

Work queues, configured in accordance with known software techniques, can be used to maintain a list of work that has been scheduled by an analyst workstation. For example, each job can be maintained in a database table. A process in the Analysis Engine performs the requested command and posts the result into the same table. The Analyst Workstation can display for each analyst the status of the jobs that have been specified.

8. Database Schema

The examples of database schema described below are defined using MySQL version 4's CREATE TABLE syntax. The main MySQL-specific types that have been used are the auto-increment type. The described tables include:

8.1. Tables updated primarily during Accession and Importing (CodePageIDs, drives, images);

8.2. Tables updated during Bulk Feature Extraction (hashids, blockhashes, fe_CreditCardNumbers, fe_NamesAndPlaces);

8.3. Tables updated during File Feature Extraction (dirnameids, filenameids, fileextensions, DirectoryEntries; and 8.4. Tables designed to support the Analyst Workstation (workQueues)

Each group of tables is described below in further detail. It is noted that the code listings are exemplary, and may be modified without departing from the scope of the invention.

8.1. Tables Updated Primarily During Accession and Importing

FIG. 20 shows a code listing 640 for creating the CodePageIDs table.

FIG. 21 shows a code listing 660 for creating the drives table.

FIG. 22 shows a code listing 680 for creating the images table. The images table holds information for every image that has been imported. Note that some of the columns are set during time of import, while other columns are set during Feature Extraction. It should be noted that the "images" table includes "Hash" and "HashAlg" columns, rather than a "HashID" column, because the central purpose of these hashes is to assure the integrity of an image file after it has been copied. As such, they are designed to be site independent. The hashes are of the uncompressed ISO image without the metadata, and can be used to verify a compression/decompression algorithm.

8.2. Tables Updated During Bulk Feature Extraction

FIG. 23 shows a code listing 700 for creating the hashids table. The hashids table maps sparse hash codes to compact site-specific integers. There is little reason to key or consider the hashaig in searches, since the chances of a hash collision between algorithms is insignificant if the hash values have the same length, and zero if the hash algorithms produce hashes of different lengths.

The following Hash algorithms are defined:

| Hash Algorithm | HashAlg Code |
|---|---|
| '5' | MD5 |
| '1' | SHA-1 |
| '2' | SHA-256 |
| '3' | SHA-512 |

The contents ID is used to code the fact that two hash values actually refer to the same contents. FIG. 24 shows the generated hashids table 720. As shown in FIG. 24, the HashIDs table 720 is preloaded with these two rows which code the two hash values for the zblock.

FIG. 25 shows a code listing 740 for creating the blockhashes table. The blockhashes table tracks which hashes have been observed on which drives. Each hashid corresponds to a hash of a single 512-byte block. This is likely to be the largest table in the Site Databank.

FIG. 26 shows a code listing 760 for creating the fe_CreditCardNumbers table.

FIG. 27 shows a code listing 780 for creating the fe_NamesAndPlaces table. This table tracks names and places that were found in the raw data.

8.3. Tables Updated During File Feature Extraction

FIG. 28 shows a code listing 800 for creating the dirnameids table. The dirnameids table provides an identifier for directory names. For example, the following directory names:.

\program files\

\program files\Microsoft Office\ would be two likely dirnameids at a site. Because both Windows and MacOS HFS ignore but preserve case, forensic analysis requires that different case representations be given different dirnameids.

FIG. 29 shows a code listing 820 for creating the filenameids table 820. The filenameids table provides an identifier for file names. For example, command.com and WORD.EXE might be two likely entries. As with dirnameids, because both Windows and MacOS HFS ignore but preserve case, forensic analysis requires that different case representations be given different filenameids.

FIG. 30 shows a code listing 840 for creating the fileextensions table. The fileextensions table provides an ID for file extensions such as .doc and .ppt. The goal here is to make it possible to rapidly execute queries such as "show me all of the Microsoft Word files from the target city."

FIG. 31 shows a code listing 860 for creating the DirectoryEntries table. The DirectoryEntries table is a master list of all pathnames found on all drives at the site. It includes complete pathnames associated with allocated files, complete pathnames associated with deleted files, and rootless pathnames provide a list of all files found on all drives.

8.4. Tables Designed to Support the Analyst Workstation

FIG. 32 shows a code listing 880 for creating the workQueues.

9. Examples of Data Formats

We next describe examples of data formats that can be used with the systems and techniques described herein. These data formats include: image file formats; bad block format; and others.

9.1 Image File Formats img: The simplest image file format is a raw dump of the disk contents. These are called ISOs by people who burn CDROMs, but in this document we term them imgs, partly to avoid confusion with CDROM images, and partly to avoid the launching of undesired application programs if the operator double-clicks on them.

img.gz: An img file compressed with gzip.

9.2 Bad Block Format

As noted above, in one embodiment of the invention, bad blocks are stored in the image file with the string "BAD BLOCK\000" follows by 502 bytes of randomly-selected data. This bad sector is created at the beginning of the imaging operation. FIG. 33 shows a pseudocode listing 900, illustrating a technique for creating a 512-byte bad block, sector.

The illustrated technique 900 codes a bit of extra information in a convenient human-readable form, while meeting the requirements described at the beginning of this section.

9.3 Alix IMG Format (AIMG)

Implementations of some embodiments of the invention used a file format known as the Alix IMG (AIMG) file format (now referred to as AFF), which was designed to accomplish the following goals: extensibility; built-in compression; ability to rapidly seek to any byte in the image file; provision to archive metadata; provision to archive arbitrary name/value pairs; byte-order independent.

One implementation that can be used would utilize DBM or Berkeley DB-formatted files for this purpose. AIMG is a single DBM file; FIG. 34 shows a table 940 of key definitions according to this aspect of the invention. Of course, the invention can also be practiced without the use of AIMG or AFF.

C. Further Examples of Methods According to the Invention

FIGS. 35-39 are a series of flowcharts, illustrating a number of general methods according to further aspects of the present invention. As will be apparent from the following description, each of the methods may be practiced using the Alix system, described above. However, it would also be possible to practice some or all of these methods using other types of systems, without departing from the scope of the invention, as claimed.

Figure 35:
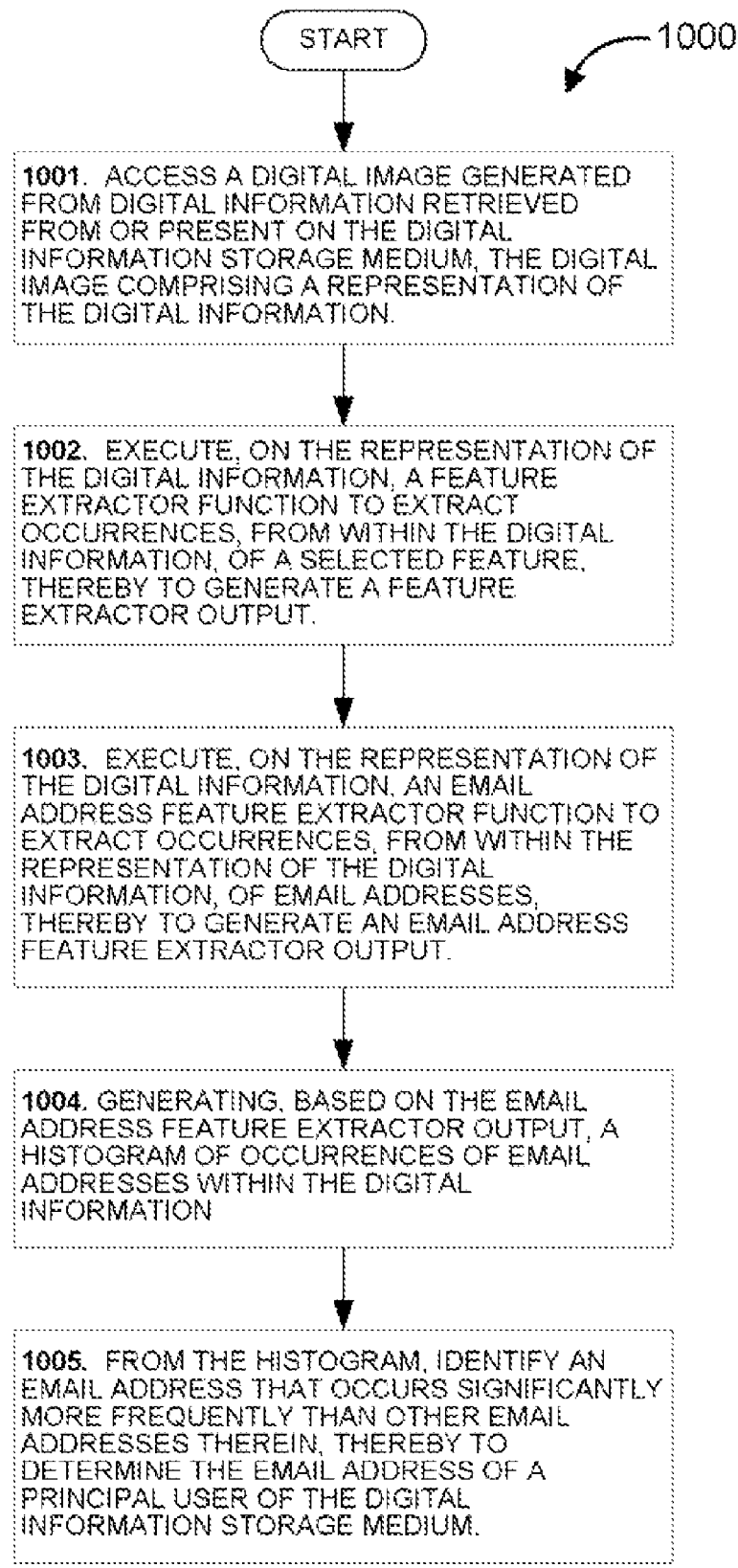
FIGS. 35-39 show a series of flowcharts, illustrating a number of general methods according to further aspects of the invention.

FIG. 35 is a flowchart of a computer-based method 1000 for determining the identity of a principal user of a digital information storage medium accessible for forensic analysis. The method 1000 includes the following steps:

Step 1001: Accessing a digital image generated from digital information retrieved from or present on the digital information storage medium, the digital image comprising a representation of the digital information.

Step 1002: Executing, on the representation of the digital information, a feature extractor function to extract occurrences, from within the digital information, of a selected feature, thereby to generate a feature extractor output.

The method further includes the step of executing a statistical analysis of the digital information, the analysis comprising:

Step 1003: Executing, on the representation of the digital information, an email address feature extractor function to extract occurrences, from within the representation of the digital information, of email addresses, thereby to generate an email address feature extractor output.

Step 1004: Generating, based on the email address feature extractor output, a histogram of occurrences of email addresses within the digital information.

Step 1005: From the histogram, identifying an email address that occurs significantly more frequently than other email addresses therein, thereby to determine the email address of a principal user of the digital information storage medium.

Figure 36:
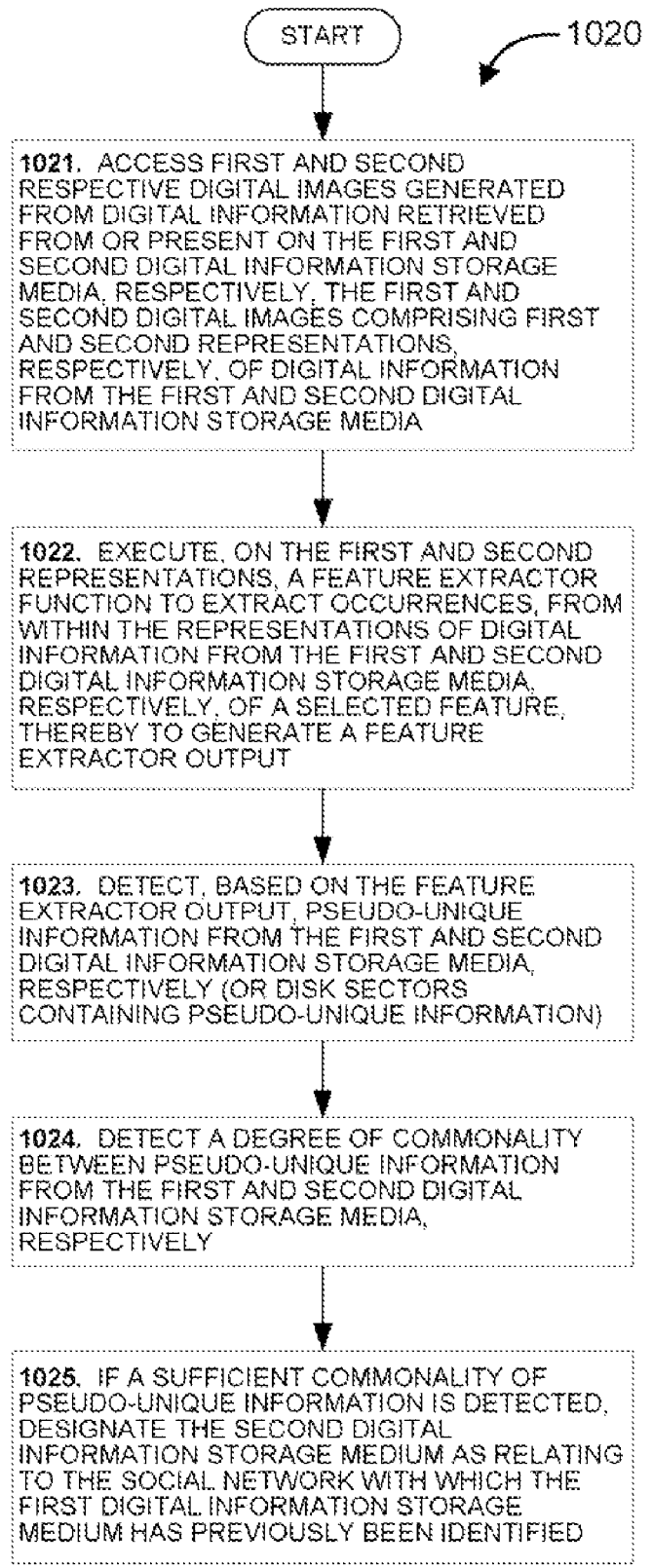

FIG. 36 is a flowchart of a computer-based method 1020 for determining whether a second digital information storage medium accessible for forensic analysis relates to a social network with which a first digital information storage medium has previously been identified, the method comprising. The method 1020 includes the following steps:

Step 1021: Accessing first and second respective digital images generated from digital information retrieved from or present on the first and second digital information storage media, respectively, the first and second digital images comprising first and second representations, respectively, of digital information from the first and second digital information storage media.

Step 1022: Executing, on the first and second representations, a feature extractor function to extract occurrences, from within the representations of digital information from the first and second digital information storage media, respectively, of a selected feature, thereby to generate a feature extractor output.

Step 1023: Detecting, based on the feature extractor output, pseudo-unique information (or disk sectors containing pseudo-unique information, i.e., pseudo-unique sectors) from the first and second digital information storage media, respectively;

Step 1024: Detecting a degree of commonality between pseudo-unique information from the first and second digital information storage media, respectively.

Step 1025: If a sufficient commonality of pseudo-unique information is detected, designating the second digital information storage medium as relating to the social network with which the first digital information storage medium has previously been identified.

Figure 37:
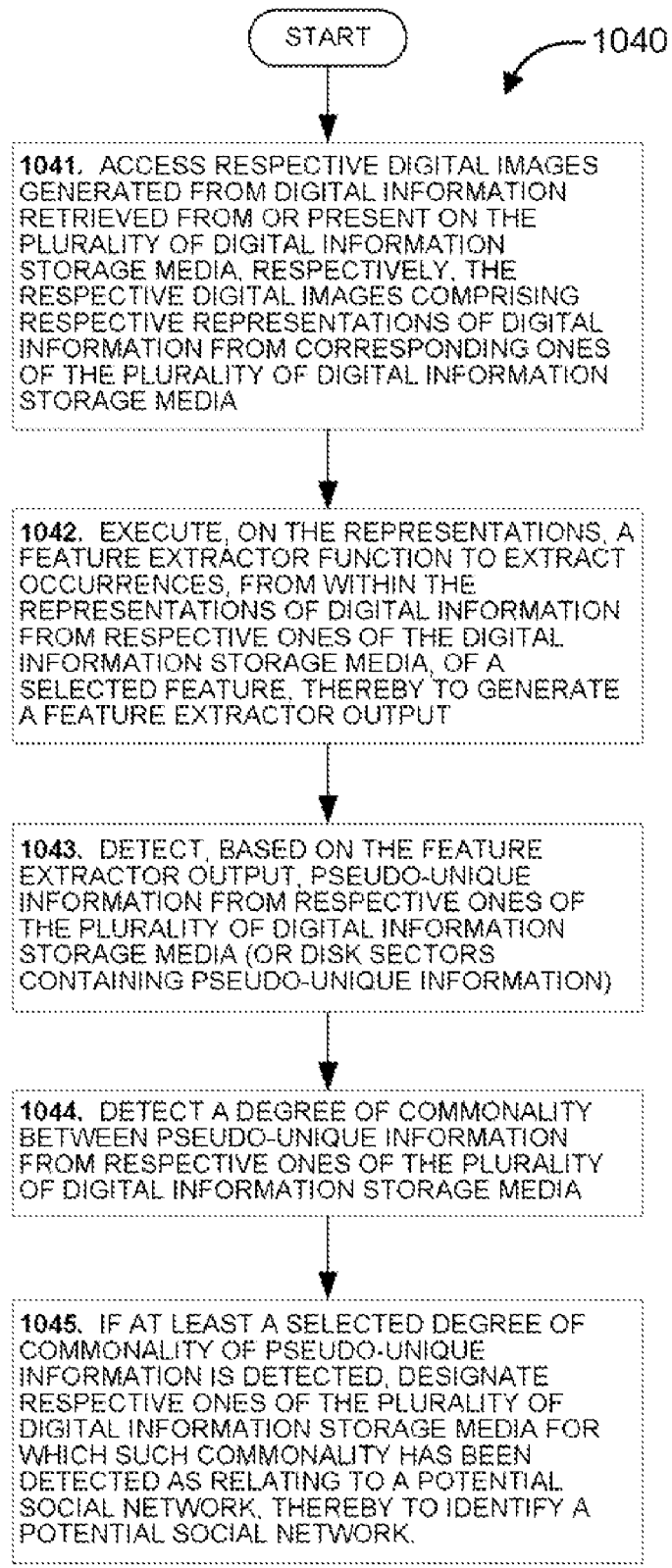

FIG. 37 is a flowchart of a computer-based method 1040 for discovering social networks with which ones of a plurality of digital information storage media accessible for forensic analysis may be identified. The method 1040 comprises the following steps:

Step 1041: Accessing respective digital images generated from digital information retrieved from or present on the plurality of digital information storage media, respectively, the respective digital images comprising respective representations of digital information from corresponding ones of the plurality of digital information storage media.

Step 1042: Executing, on the representations, a feature extractor function to extract occurrences, from within the representations of digital information from respective ones of the digital information storage media, of a selected feature, thereby to generate a feature extractor output.

Step 1043: Detecting, based on the feature extractor output, pseudo-unique information (or disk sectors containing pseudo-unique information, i.e., pseudo-unique sectors) from respective ones of the plurality of digital information storage media.

Step 1044: Detecting a degree of commonality between pseudo-unique information from respective ones of the plurality of digital information storage media Step 1045: If at least a selected degree of commonality of pseudo-unique information is detected, designating respective ones of the plurality of digital information storage media for which such commonality has been detected as relating to a potential social network, thereby to identify a potential social network.

Figure 38:
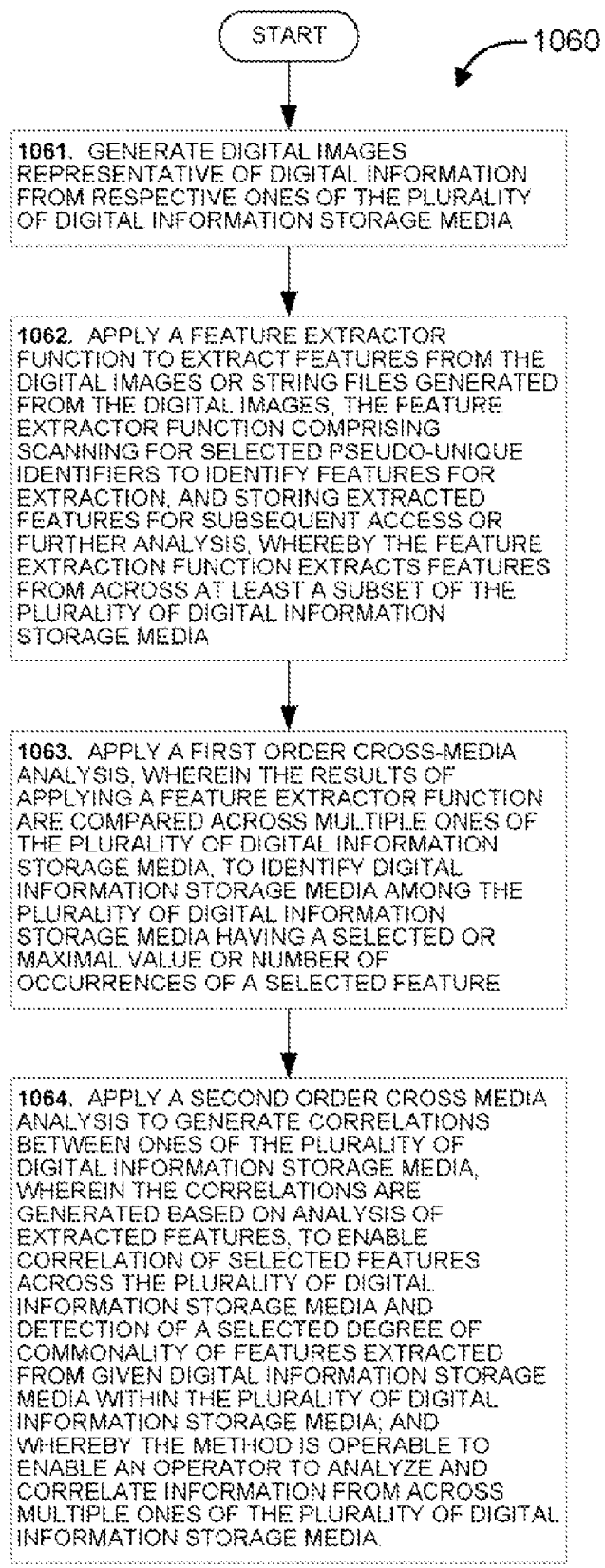

FIG. 38 is a flowchart of a computer-based method 1060 for analyzing digital information present on or retrieved from a plurality of digital information storage media. The method comprises the following steps:

Step 1061: Generating digital images representative of digital information from respective ones of the plurality of digital information storage media.

Step 1062: Applying a feature extractor function to extract features from the digital images or string files generated from the digital images, the feature extractor function comprising scanning for selected pseudo-unique identifiers to identify features for extraction, and storing extracted features for subsequent access or further analysis, whereby the feature extraction function extracts features from across at least a subset of the plurality of digital information storage media Step 1063: Applying a first order cross-media analysis, wherein the results of applying a feature extractor function are compared across multiple ones of the plurality of digital information storage media, to identify digital information storage media among the plurality of digital information storage media having a selected or maximal value or number of occurrences of a selected feature.

Step 1064: Applying a second order cross media analysis to generate correlations between ones of the plurality of digital information storage media, wherein the correlations are generated based on analysis of extracted features, to enable correlation of selected features across the plurality of digital information storage media and detection of a selected degree of commonality of features extracted from given digital information storage media within the plurality of digital information storage media; and whereby the method is operable to enable an operator to analyze and correlate information from across multiple ones of the plurality of digital information storage media.

Figure 39:
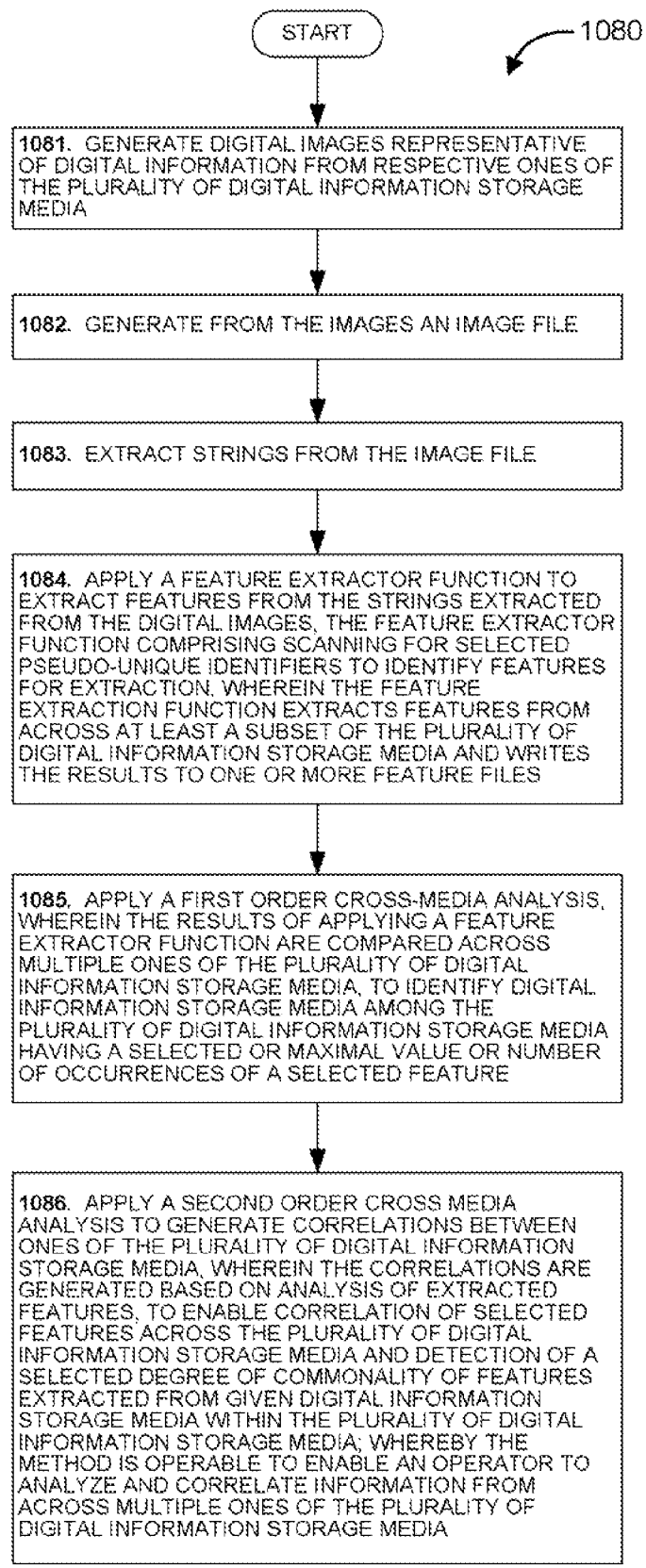

FIG. 39 is a flowchart of a computer-based method 1080 for analyzing digital information present on or retrieved from a plurality of digital information storage media. The method 1080 comprises the following steps:

Step 1081: Generating digital images representative of digital information from respective ones of the plurality of digital information storage media.

Step 1082: Generating from the images an image file.

Step 1083: Extracting strings from the image file.

Step 1084: Applying a feature extractor function to extract features from the strings extracted from the digital images, the feature extractor function comprising scanning for selected pseudo-unique identifiers to identify features for extraction, wherein the feature extraction function extracts features from across at least a subset of the plurality of digital information storage media and writes the results to one or more feature files.

Step 1085: Applying a first order cross-media analysis, wherein the results of applying a feature extractor function are compared across multiple ones of the plurality of digital information storage media, to identify digital information storage media among the plurality of digital information storage media having a selected or maximal value or number of occurrences of a selected feature.

Step 1086: Applying a second order cross media analysis to generate correlations between ones of the plurality of digital information storage media, wherein the correlations are generated based on analysis of extracted features, to enable correlation of selected features across the plurality of digital information storage media and detection of a selected degree of commonality of features extracted from given digital information storage media within the plurality of digital information storage media; whereby the method is operable to enable an operator to analyze and correlate information from across multiple ones of the plurality of digital information storage media.

D. Conclusions

Those skilled in the art will appreciate that the detailed description set forth in the following sections is intended not to be limiting, but to be illustrative of various implementations, examples, embodiments and practices of the invention, of which there can be many variations and modifications.

For example, aspects of the invention described above and claimed below can be practiced without using the complete Alix architecture described herein. As a further example, the invention could be practiced in connection with a Unicode-aware version of "strings" that can take a block of data and isolate all of the "words"; a filter than can evaluate a list of "words" and determine which are the critical words that should be indexed (a functionality that is within products and software solutions available from Basis Technology Corp. of Cambridge, Mass.); and/or a filter that can take the words to be indexed and store them in various forms, which may include using the actual representation in which they appear, and in standardized, phonetic spelling.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A computer-based method for determining whether a second digital information storage medium accessible for forensic analysis relates to a social network with which a first digital information storage medium has previously been identified, the method comprising:

accessing first and second respective digital images generated from digital information retrieved from or present on the first and second digital information storage media, respectively, the first and second digital images comprising first and second representations, respectively, of digital information from the first and second digital information storage media;

executing, on the first and second representations, a feature extractor function to extract occurrences, from within the representations of digital information from the first and second digital information storage media, respectively, of a selected feature, thereby to generate a feature extractor output;

detecting, based on the feature extractor output, pseudo-unique information from the first and second digital information storage media, respectively;

detecting a degree of commonality between pseudo-unique information from the first and second digital information storage media, respectively; and, if a sufficient commonality of pseudo-unique information is detected, designating the second digital information storage medium as relating to the social network with which the first digital information storage medium has previously been identified.

2. The method of claim 1 wherein the feature extractor function stores feature extractor output in a feature file for further processing or analysis.

3. The method of claim 1 wherein the feature extractor function comprises any of an email address extractor, an email message ID extractor, an email Subject extractor, an email date extractor, a cookie extractor, a Social Security number extractor, or a credit card number extractor.

4. The method of claim 1 wherein the feature extractor function comprises differentiating between values that are common and those that are relatively rare within the data extracted from across a plurality of digital information storage media.

5. The method of claim 1 wherein the digital information storage media comprise disk drives having disk sectors, and further comprising utilizing hash codes of individual disk sectors for analysis, detection or correlation, rather than directly using the extracted digital information.

6. The method of claim 1 further comprising:
first extracting 8-bit, 16-bit, and/or Unicode strings from the digital images; and
then using the strings for subsequent processing or analysis, rather than executing processing or analysis based directly on the digital images.

7. The method of claim 1 further comprising prioritizing the digital information storage media for further analysis based on extracted features.

8. The method of claim 1 further comprising utilizing extracted features to determine the identity of a principal user of a given digital information storage medium.

9. The method of claim 8 wherein determining the identity of a principal user of a given digital information storage medium comprises generating a histogram of occurrences of an extracted feature.

10. The method of claim 1 further comprising scanning a digital information storage medium to identify the likely existence of information designated or required to have been expunged.

11. The method of claim 1 wherein the digital information storage media comprise disk drives having disk sectors, and further comprising determining whether a given file is likely to have been present on a disk drive, based on detection of the presence on the disk of a pseudo-unique sector, or sector containing pseudo-unique information identifiable with the given file.

12. A computer-based method for discovering social networks with which ones of a plurality of digital information storage media accessible for forensic analysis may be identified, the method comprising:
accessing respective digital images generated from digital information retrieved from or present on the plurality of digital information storage media, respectively, the respective digital images comprising respective representations of digital information from corresponding ones of the plurality of digital information storage media;
executing, on the representations, a feature extractor function to extract occurrences, from within the representations of digital information from respective ones of the digital information storage media, of a selected feature, thereby to generate a feature extractor output;
detecting, based on the feature extractor output, pseudo-unique information from respective ones of the plurality of digital information storage media;
detecting a degree of commonality between pseudo-unique information from respective ones of the plurality of digital information storage media; and,
if at least a selected degree of commonality of pseudo-unique information is detected, designating respective ones of the plurality of digital information storage media for which such commonality has been detected as relating to a potential social network, thereby to identify a potential social network.

13. The method of claim 12 further comprising identifying, based on the detecting of at least a selected degree of commonality of pseudo-unique information thereon, clusters of digital information storage media as identifiable with a given social network or organizational entity.

14. A computer-based method of analyzing digital information present on or retrieved from a plurality of digital information storage media, the method comprising:
generating digital images representative of digital information from respective ones of the plurality of digital information storage media;
applying a feature extractor function to extract features from the digital images or string files generated from the digital images, the feature extractor function comprising scanning for selected pseudo-unique identifiers to identify features for extraction, and storing extracted features for subsequent access or further analysis, whereby the feature extraction function extracts features from across at least a subset of the plurality of digital information storage media;
applying a first order cross-media analysis, wherein the results of applying a feature extractor function are compared across multiple ones of the plurality of digital information storage media, to identify digital information storage media among the plurality of digital information storage media having a selected or maximal value or number of occurrences of a selected feature;
applying a second order cross media analysis to generate correlations between ones of the plurality of digital information storage media, wherein the correlations are generated based on analysis of extracted features, to enable correlation of selected features across the plurality of digital information storage media and detection of a selected degree of commonality of features extracted from given digital information storage media within the plurality of digital information storage media; and
whereby the method is operable to enable an operator to analyze and correlate information from across multiple ones of the plurality of digital information storage media.

15. The method of claim 14 wherein applying a second order cross media analysis further comprises executing a multi-source correlation function, wherein the correlation function comprises reading a plurality of feature files and generating from the reading of the plurality of feature files an output containing, for each selected feature, a list comprising the number of digital information storage media on which the selected feature was detected, the total number of times the selected feature was detected on all digital information storage media under analysis, and a listing of digital information storage media on which the selected feature occurs.

16. The method of claim 15 wherein the correlation function is characterized by an input comprising a set of digital images in a feature to be correlated, and an output comprising a list of (feature, drive-list) tuples.

17. The method of claim 16 wherein the correlation function further comprises executing a scoring function compris- 18. The method of claim 17 wherein the scoring function comprises summing the number of features that two selected digital information storage media have in common.

19. The method of claim 17 wherein the scoring function comprises a weighting function that discounts features by the number of digital information storage media on which they appear.

20. The method of claim 17 wherein the scoring function comprises a weighting function that accords increased weight to rare features present in high concentrations on the selected digital information storage media.

21. The method of claim 14 wherein the method further comprises automatically identifying "hot" digital information storage media, the "hot" media comprising media within the plurality of digital information storage media under analysis that contain one or more features of interest to an operator, and that should be accorded higher priority for further analysis.

22. The method of claim 21 further comprising assigning priority values to ones of the plurality of digital information storage media as a function of detection of media having the largest numbers of occurrences of selected features.

23. The method of claim 22 further comprising automatically identifying media containing a high concentration of selected features that are selected as being of interest to an analyst.

24. The method of claim 14 further comprising generating a "stop list" of feature values that can be disregarded, substantially without loss of generality, by subsequent analysis processes, wherein the listed feature values are substantially ubiquitous across the plurality of digital information storage media under analysis.

25. The method of claim 24 further comprising using the stop list to suppress output relating to the listed feature values of the stop list.

26. The method of claim 14 further comprising identifying social network membership and determining whether a newly-ingested digital information storage medium was previously utilized by an element of the social network.

27. A computer-based method of analyzing digital information present on or retrieved from a plurality of digital information storage media, the method comprising:
generating digital images representative of digital information from respective ones of the plurality of digital information storage media;
generating from the images an image file;
extracting strings from the image file;
applying a feature extractor function to extract features from the strings extracted from the digital images, the feature extractor function comprising scanning for selected pseudo-unique identifiers to identify features for extraction, wherein the feature extraction function extracts features from across at least a subset of the plurality of digital information storage media and writes the results to one or more feature files;
applying a first order cross-media analysis, wherein the results of applying a feature extractor function are compared across multiple ones of the plurality of digital information storage media, to identify digital information storage media among the plurality of digital information storage media having a selected or maximal value or number of occurrences of a selected feature; and
applying a second order cross media analysis to generate correlations between ones of the plurality of digital information storage media, wherein the correlations are generated based on analysis of extracted features, to enable correlation of selected features across the plurality of digital information storage media and detection of a selected degree of commonality of features extracted from given digital information storage media within the plurality of digital information storage media;
whereby the method is operable to enable an operator to analyze and correlate information from across multiple ones of the plurality of digital information storage media.

28. The method of claim 27 wherein the strings are extracted using a file format-aware program in multiple passes, including one for 8-bit characters, one for 16-bit characters in LSB format, and one for 16-bit characters in MSB format.

29. The method of claim 28 wherein extracted features from newly-ingested drives are run against a watch list, and hits against the watch list are reported to a human operator.

30. The method of claim 29 wherein the feature files are read by indexers operable to build indexes, in a database server, of the identified features.

31. The method of claim 30 further comprising executing a multi-drive correlation to determine whether a newly accessioned drive contains features in common with any drives that are on a drive watch list.

32. The method of claim 31 further comprising providing a user interface operable to enable a human operator to interact with the images, files, or results.

33. The method of claim 32 wherein the user interface is a multi-user interface operable to enable multiple operators to simultaneously interact with the images, files or results.

34. A computer-based system for determining whether a second digital information storage medium accessible for forensic analysis relates to a social network with which a first digital information storage medium has previously been identified, the system comprising:
means for accessing first and second respective digital images generated from digital information retrieved from or present on the first and second digital information storage media, respectively, the first and second digital images comprising first and second representations, respectively, of digital information from the first and second digital information storage media;
means for executing, on the first and second representations, a feature extractor function to extract occurrences, from within the representations of digital information from the first and second digital information storage media, respectively, of a selected feature, thereby to generate a feature extractor output;
means for detecting, based on the feature extractor output; pseudo-unique information from the first and second digital information storage media, respectively;
means for detecting a degree of commonality between pseudo-unique information from the first and second digital information storage media, respectively; and,
means for, if a sufficient commonality of pseudo-unique information is detected, designating the second digital information storage medium as relating to the social network with which the first digital information storage medium has previously been identified.

35. A computer program product operable within a computer, the computer program product being operable to enable the computer to determine whether a second digital information storage medium accessible for forensic analysis relates to a social network with which a first digital information storage medium has previously been identified, the computer program product comprising:

a non-transitory computer readable medium having computer-executable program code stored thereon, the computer-executable program code comprising program code executable by the computer to enable the computer to:

access first and second respective digital images generated from digital information retrieved from or present on the first and second digital information storage media, respectively, the first and second digital images comprising first and second representations, respectively, of digital information from the first and second digital information storage media;

execute, on the first and second representations, a feature extractor function to extract occurrences, from within the representations of digital information from the first and second digital information storage media, respectively, of a selected feature, thereby to generate a feature extractor output;

detect, based on the feature extractor output, pseudo-unique information from the first and second digital information storage media, respectively;

detect a degree of commonality between pseudo-unique information from the first and second digital information storage media, respectively; and, if a sufficient commonality of pseudo-unique information is detected, designate the second digital information storage medium as relating to the social network with which the first digital information storage medium has previously been identified.

* * * * *